United States Patent
Le Leannec et al.

(10) Patent No.: US 7,397,958 B2
(45) Date of Patent: Jul. 8, 2008

(54) METHOD AND DEVICE FOR SELECTING DATA IN A COMMUNICATION NETWORK

(75) Inventors: Fabrice Le Leannec, Cesson Sevigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/684,504

(22) Filed: Oct. 15, 2003

(65) Prior Publication Data

US 2004/0136598 A1 Jul. 15, 2004

(30) Foreign Application Priority Data

Oct. 16, 2002 (FR) .................................. 02 12881

(51) Int. Cl.
*G06K 9/36* (2006.01)
(52) U.S. Cl. ..................... 382/233; 382/246; 382/232
(58) Field of Classification Search .................. None
See application file for complete search history.

(56) References Cited

U.S. PATENT DOCUMENTS 6,178,204 B1    1/2001  Hazra ................. 375/240.25
2003/0018818 A1*  1/2003  Boliek et al. ............. 709/247

FOREIGN PATENT DOCUMENTS

WO    WO 01/80561    10/2001

OTHER PUBLICATIONS

Prandolini et al. JPEG 2000 Image Coding System—Part 9: Interactivity tools, APIs and protocols—Final committee Draft, ISO/IEC JTC 1/SC 29/WG 1, Aug. 7, 2003.*

D. Taubman "The JPIK Protocol (JPEG 2000 Interactive Kakadu)", The JPIK Protocol, Nov. 30, 2001, pp. 1-22.*

Deshpande et al, "HTTP Streaming of JPEG2000 Images", Proceedings International Conference on Information Technology: Coding and Computer, pp. 15-19.*

D. Taubman, "The JPIK Protocol (JPeg 2000 Interactive, Kakadu)", The JPIK Protocol, Nov. 30, 2001, pp. 1-22, <URL:http://www.kakadusoftware.com/jpik.pdf>, visit d Jun. 4, 2003.

(Continued)

*Primary Examiner*—Bhavesh Mehta
*Assistant Examiner*—Sean Motsinger
(74) *Attorney, Agent, or Firm*—Fitzpatrick, Cella, Harper & Scinto

(57) ABSTRACT

The invention relates to a method of selecting data of a compressed digital signal comprising a plurality of levels of spatial granularity of data, in a communication network comprising at least two communication apparatuses connected together by the network, the digital signal being available at least at one, so-called first, of the communication apparatuses, the data being adapted to be transmitted from the first apparatus to the other, so-called second, communication apparatus, and that data being sufficient to reconstitute a spatial part of the signal termed region of interest which is specified at the second apparatus, characterized in that the method comprises the following steps:

determining (S76; S78; S80) at least one level of spatial granularity of data as a function of the region of interest and of the structure and organization of the data in the signal;

selecting (S77; S79; S81) data for each determined level of granularity as a function of the region of interest and of the structure and organization of the data in the signal.

36 Claims, 13 Drawing Sheets

OTHER PUBLICATIONS

J. Li, et al., "A virtual media (Vmedia) access protocol and its application in interactive image browsing", SPIE IS&T and ACM Sig Multimedia, Multimedia Computing And Networking 2001, vol. 4312, No. 10, pp. 1-13. <URL:http://research.microsoft.com/users/jlnl/paper_paper_2001/mmcn01_vmedia.PDF>, visited Jun. 4, 2003.

M. Boliek, et al., "JPEG 2000 For Efficient Imaging In A Client/Server Environment", Proceedings Of The SPIE, SPIE, Bellingham, VA, Jul. 31, 2001, vol. 4472, pp. 212-223.

S. Deshpande, et al., "HTTP Streaming of JPEG2000 Images", Proceedings International Conference On Information Technology: Coding And Computing, pp. 15-19.

D. Taubman, "Remote Browsing Of JPEG2000 Images", Proceedings 2002 International Conference On Image Processing. Sep. 22-25, 2002, New York, NY, IEEE, US, vol. 1 of 3, pp. 229-232.

R. Prandolini, et al., JPEG 2000 image coding system—Part 9: Interactivity tools, APIs and protocols—Final Committee Draft, ISO/IEC JTC 1/SC 29/WG 1, Aug. 7, 2003.

R. Fielding, et al., "Hypertext Transfer Protocol—HTTP/1.1", <http://www.w3.org/Protocol/rfc2616,html>.

* cited by examiner

METHOD AND DEVICE FOR SELECTING DATA IN A COMMUNICATION NETWORK

The present invention relates to a method and a device for selecting data of a compressed digital signal comprising a plurality of levels of spatial granularity of data, in a communication network comprising at least two communication apparatuses connected together by the network, the digital signal being available at least at one, so-called first, of the communication apparatuses, the selected data being adapted to be transmitted from the first apparatus to the other, so-called second, communication apparatus, and that data being sufficient to reconstitute a spatial part of the signal termed region of interest which is specified at the second apparatus.

Communication architectures are known of the type of those in which at least two communication apparatuses, one being termed server and the other client machine (several client machines being able to communicate with one server), communicate together via a communication network which may, for example, be a wired network, a radio network, etc.

In such a communication architecture, commonly referred to as client-server architecture, digital data constituting one or more signals are stored on the communication apparatus termed server.

When the user of one of the client machines of the network wishes to receive a part of one of the signals available on the server, he must beforehand send a request via the client machine to which he is connected.

The request so formulated is transmitted to the server which then processes the request in order to later transmit the requested part of the signal to the client machine that sent the request.

In particular a worthwhile application of the above is found in the field of the processing of images and, more particularly, of images in accordance with the JPEG2000 standard.

In that field, it is indeed frequent for a user to wish to access a sub-image of an image stored on a server.

According to the JPEG2000 standard, an image signal is usually composed of an optional preamble and a bitstream comprising main header data and at least one tile which represents, in compressed manner, a rectangular part of the original image signal considered.

Each tile is formed of tile header data and a set of compressed data constituting the body of the tile and which comprises a sequence of data packets.

Each data packet contains packet header data and a packet body which contains at least one code-block.

Each code-block is a compressed representation of an elementary rectangular part of an image signal that may possibly be transformed into frequency sub-bands.

The header data of each packet provide both the list of the code-blocks contained in the body of the packet under consideration, as well as the compression parameters specific to each of the code-blocks.

Each code-block is compressed at a plurality of incremental quality levels or layers, i.e. a base layer and several layers of refinement.

Each level or layer of quality of a code-block is contained in a distinct packet.

Thus, a data packet of an image signal in accordance with the JPEG2000 standard contains a set of code-blocks corresponding to a given tile, component, resolution level, quality level or layer and precinct.

In the field of image processing in accordance with the JPEG2000 standard, a protocol commonly designated by the term JPIK (JPEG2000 Interactive, Kakadu) is known, according to the document "The JPIK protocol" (JPEG2000 Interactive, Kakadu) by David Taubman, UNSW, Nov. 30, 2001.

This document provides for the server, in a communication architecture of client-server type, to be given the responsibility of choosing the compressed data in accordance with the JPEG2000 standard which are to be transmitted to the client machine.

Before carrying out that transmission, the server performs a transcoding of the original JPEG2000 image signal into a bitstream still in accordance with that same standard and which is constituted by numerous precincts of small dimension.

Each precinct is represented by a series of successive bytes which is extracted from the set of all the code-blocks concatenated in the image signal and which contribute to the precinct considered.

In this document, the series of bytes representing the given precinct is termed a "JPIK-increment".

The JPIK protocol proposed by that document has the drawback of requiring the aforementioned transcoding step for its implementation, which represents a relatively burdensome task to accomplish.

It would thus be worthwhile to be able to relieve the server in relation to the processing of the request from a client machine by avoiding to have to use the aforementioned transcoding step.

Furthermore, it would also be worthwhile to improve the overall efficiency of data transfer in a communication architecture, for example of client-server type, or, more generally, between at least two communication apparatuses. It could, for example, be possible to achieve that either by optimizing the use of the bandwidth of the communication network between the server and the client machine considered, or by reducing the number of operations to perform on processing the request, which would amount to increasing the processing speed of such a request.

The present invention aims to remedy at least one of the aforementioned drawbacks by providing a method of selecting data of a compressed digital signal comprising a plurality of levels of spatial granularity of data, in a communication network comprising at least two communication apparatuses connected together by the network, the digital signal being available at least at one, so-called first, of the communication apparatuses, the selected data being adapted to be transmitted from the first apparatus to the other, so-called second, communication apparatus, and that data being sufficient to reconstitute a spatial part of the signal termed region of interest which is specified at the second apparatus, characterized in that the method comprises the following steps:

determining at least one level of spatial granularity of data as a function of the region of interest and of the structure and organization of the data in the signal, selecting data for each determined level of granularity as a function of the region of interest and of the structure and organization of the data in the signal.

In a complementary manner, the present invention also relates to a device for selecting data of a compressed digital signal comprising a plurality of levels of spatial granularity of data, in a communication network comprising at least two communication apparatuses connected together by the network, the digital signal being available at least at one, so-called first, of the communication apparatuses, the selected data being adapted to be transmitted from the first apparatus to the other, so-called second, communication apparatus, and that data being sufficient to reconstitute a spatial part of the signal termed region of interest which is specified at the second apparatus, characterized in that the device comprises:

means for determining at least one level of spatial granularity of data as a function of the region of interest and of the structure and organization of the data in the signal, means for selecting data for each determined level of granularity as a function of the region of interest and of the structure and organization of the data in the signal.

By taking a decision as to the level of granularity of the data to transmit as a function of the desired region of interest and of the signal, the volume of data to be transmitted is optimized and the efficiency of later transfer of that data is thus improved overall.

Furthermore, the invention makes it possible to determine a plurality of heterogeneous levels of spatial granularity adapted to the request.

By transmitting data of heterogeneous levels of spatial granularity, the first communication apparatus, that is to say for example the server, will not have to perform a systematic transcoding of the data required to transform them into a series of precincts.

According to the level of granularity chosen, this also makes it possible to simplify the processing of the request at the first communication apparatus by reducing the number of tasks to perform.

The processing of a request may thus be facilitated.

Moreover, when the decision as to the level of granularity is taken at the second communication apparatus, that is to say in a client machine, this makes it possible to directly affect the requests or commands to transmit to the first apparatus specifying compressed data to receive.

This is because those commands are each addressed to data of the signal corresponding to a determined level of granularity.

By choosing the level of granularity adapted to the region of interest and to the signal, a compromise is established between the number of commands to transmit and the volume of data which will later be received by the second apparatus.

It should be noted that the aforementioned steps of determining and selecting may be advantageously carried out in the first or in the second communication apparatus.

If these steps are carried out in the second apparatus, this considerably reduces the remaining task to be carried out by the first apparatus, that is to say the server, on later processing of the region of interest.

The task of the first apparatus is thus made lighter, independently of the fact of that apparatus no longer performing the transcoding of the data to be transmitted as mentioned above.

Furthermore, the levels of granularity of the data are selected in a dynamic manner as a function of different criteria which are the region of interest, the structure and organization of the data in the signal and possibly the context of transmission given by the communication architecture considered.

According to another feature, the method according to the invention comprises a prior step of determining a set of data necessary to satisfy the request and not yet received by the second communication apparatus, taking into account the data which have been received previously by that apparatus, the determination of at least one level of spatial granularity depending on that set of data.

In this manner, account is advantageously taken of data stored locally on the second communication apparatus so as to not to have to later re-transmit data identical to those already received.

Furthermore, the level of granularity of the data which will be selected takes into account the proportion of the set of data not yet received.

Advantageously, the invention also provides for taking a decision as to the level of granularity of the data which the first communication apparatus will have to transmit to the second communication apparatus as a function of at least one characteristic of the network (bandwidth, for example) and/or at least one characteristic of at least one of the first and second communication apparatuses (storage or computational capacity of the apparatus considered, for example).

According to one feature, prior to the step of determining at least one level of granularity of data, the method comprises at least one step of comparing, with respect to a threshold, the ratio of the sum of the quantity of data already present on the second apparatus plus the minimum quantity of data to be received by the second apparatus to reconstitute the region of interest, to the total quantity of data present in the signal, the data of the ratio corresponding to a given level of spatial granularity.

Where there is at least one level of spatial granularity hierarchically lower than the given level of the first step of comparison, then as a function of the result of the comparison, either the selecting step makes provision for selecting a superset of data with respect to the set of data necessary and not yet received, or the method comprises a second step of comparing, with respect to a threshold, a ratio using a proportion of data of a hierarchically lower level of spatial granularity.

The transmission of a superset of data make it possible to carry out an additional transmission of data, thus anticipating possible other regions of interest.

Where the given level of spatial granularity of the first comparing step is the lowest level hierarchically, then as a function of the result of the comparison, the selecting step makes provision for selecting, either a superset of data with respect to the set of data that is necessary and not yet received, or only that set.

According to another feature, in case a superset of data is selected, the method comprises a third step of comparison, with respect to a threshold, of the ratio of the quantity of data not received to the total quantity of data present in the signal, the data corresponding to the same given level of spatial granularity as for the first comparison step.

The content of this superset of data depends on the result of the comparison.

As a function of the result of the comparison, the step of determining a level of spatial granularity leads either to the given level of spatial granularity of the first step of comparison, or to a level of spatial granularity hierarchically superior.

The volume of data contained in this superset is larger or smaller as a function of one or more predetermined criteria.

Moreover, in the case in which the selection is made at the second apparatus, the number of commands to transmit to obtain the level or levels of granularity depends on the result of the comparison.

According to one feature, the threshold represents the characteristic or characteristics of the network and/or of the characteristic or characteristics of at least one of the first and second communication apparatuses.

Thus, one or more levels of spatial granularity are determined and the data corresponding to those levels of spatial granularity are selected as a function of the aforementioned characteristic or characteristics.

More data will be selected when the aforementioned characteristic or characteristics are less restrictive.

On the other hand, if a characteristic such as the bandwidth available on the network proves to be low, it will consequently be necessary to adapt the volume of data to be selected and, as a consequence, to provide only the set of data necessary to satisfy the user's request and which have not yet been received.

According to a first embodiment of the invention, the steps of determining and selecting are carried out by the second communication apparatus, i.e., in the example considered, a client machine.

In this first embodiment, the method comprises a step of transmitting commands to the first communication apparatus specifying data of different levels of spatial granularity which have been selected, each command specifying data of the signal at a level of granularity which has been determined.

By choosing the level of spatial granularity of the data to receive, the client machine is able to reduce the number of commands or requests to transmit to the first communication apparatus.

According to a second embodiment of the invention, the steps of determining and selecting are carried out by the first communication apparatus.

According to one feature, the method comprises a step performed by the first communication apparatus of storing data which it has previously transmitted to the second communication apparatus in response to one or more earlier requests from the latter.

Thus the first communication apparatus keeps a trace of the data transmitted and may thus decide, when it makes the selection of data to transmit to the second communication apparatus to satisfy the user's request, not to send certain data which it considers to be already available on the second communication apparatus.

According to a variant embodiment, the method comprises a step performed by the first communication apparatus, of receiving from the second communication apparatus information on the data which the latter has previously received in response to one or more previous requests.

In this variant, the server does not have to keep a trace of the data which it transmits to the second communication apparatus since the second communication apparatus in a way sends it the status of its cache memory.

More particularly, the compressed digital signal is an image signal comprising at least one tile having at least one resolution level, each resolution level comprising at least one precinct constituted by at least one code-block, which is located in the different frequency sub-bands of the resolution level considered and which corresponds to the same spatial position in the image signal.

According to one feature, the step of determining at least one level of spatial granularity of the data provides for choosing a level of granularity between the tile of the signal and/or the precinct and/or the code-block.

It will be noted that all the combinations are possible between these three different levels of spatial granularity.

The invention also relates to a communication apparatus comprising a device for selecting data, as briefly disclosed above.

According to another aspect, the invention also relates to:
an information storage means which can be read by a computer or a microprocessor comprising code instructions for a computer program for executing the steps of the method according to the invention as for the one briefly set out above, and
a partially or totally removable information storage means which can be read by a computer or microprocessor comprising code instructions for a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method of the invention as briefly set out above, when said computer program is loaded and executed on the programmable apparatus.

As the features and advantages relating to the device for selecting received data, to the communication apparatus comprising such a device, to the information storage means and to the computer program are the same as those set out above concerning the method according to the invention, they will not be repeated here.

Other features and advantages of the present invention will emerge more clearly from a reading of the following description, given with reference to the accompanying drawings, in which:

FIG. 1 is a very diagrammatic representation of a communication architecture of the client-server type in which the invention is advantageously implemented;

Figure 1:
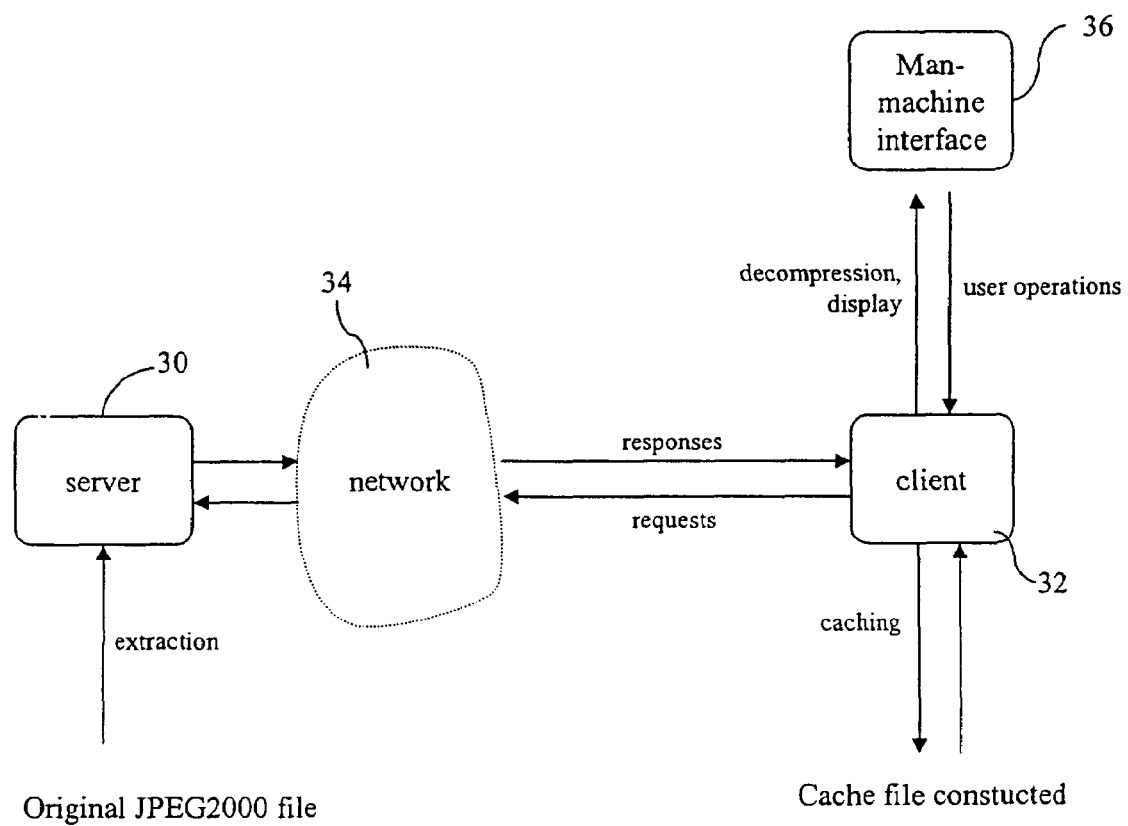
FIG. 1 is a diagram of a communication architecture of the client-server type in which the invention is implemented.

As shown in FIG. 1, a first communication apparatus 30 (server) is connected to a second communication apparatus 32 (client machine) via a communication network 34.

It will be noted that a plurality of client machines may also communicate with the server via the network 34.

Moreover, the invention applies in addition to distributed networks.

In a client-server type communication architecture, a compressed digital signal, for example a compressed image signal, is stored on the server 30.

A user interacting with the client machine 32, via a man-machine interface 36, will seek to obtain a part of the digital data constituting the compressed signal stored on the server, for example, in order to view the image interactively. This is accompanied by the formulation, in the client machine 32, of a user request specifying the desired part of the compressed digital signal, also termed region of interest.

According to a first embodiment, the invention is implemented in the client machine 32 to select sufficient data to reconstitute the region of interest specified in the user request.

The partial processing of the request consists in particular of dynamically selecting the non-received data necessary to satisfy the request and to optimize them. The server then receives a set of commands identifying these selected data and extracts the selected data from the signal and then transmits them to the client machine.

The selection of the data in the client machine thus makes the task of the server lighter.

According to a second embodiment, the invention is implemented in the server 30 to select sufficient data therein to reconstitute the region of interest specified in the user request.

Thus, the client machines of small computational and/or storage capacity are relieved of that task.

Furthermore, as the processing of the data according to the invention does not require transcoding to be performed of the data to transmit, as in the prior art, the server is thereby relieved in its task.

Overall, an exchange of data takes the form of requests and responses which are transmitted between the client machine 32 and the server 30 via the communication network 34.

The data thus received by the client machine 32 are stored in a cache type memory, which avoids having to transmit several times to the server requests corresponding to the same part of the signal (region of interest) requested by the user at different instants.

This also makes it possible, as will be seen further on, not to re-transmit from the server to the client machine data already transmitted but for a request specifying a non-identical part of the signal.

It should be noted that the data received by the client machine are next uncompressed and displayed in order to be used by the user via the man-machine interface 36.

It will be noted that for the following description the compressed digital signal is more particularly an image signal although it may also take the form, for example, of a video signal or an audio signal.

More particularly, the compressed digital signal corresponds to an image signal in accordance with the JPEG2000 standard.

Thus, the signals stored respectively on the server 30 and on the client machine 32 (part of the signal) are stored in the form of computer files, i.e. an original JPEG2000 file for the server and a so-called cache file for the client machine.

It will be noted furthermore that the original compressed digital signal may come from other communication apparatuses which are connected to the server by another communication network.

In the example considered, the server 30 is, for example, a computer and the client machine 32 a micro-computer, or even a digital camera, a mobile phone, or a personal assistant of PDA ("Personal Digital Assistant") type.

Moreover, the communication network 34 may for example be of wired, radio or other type.

Figure 2:
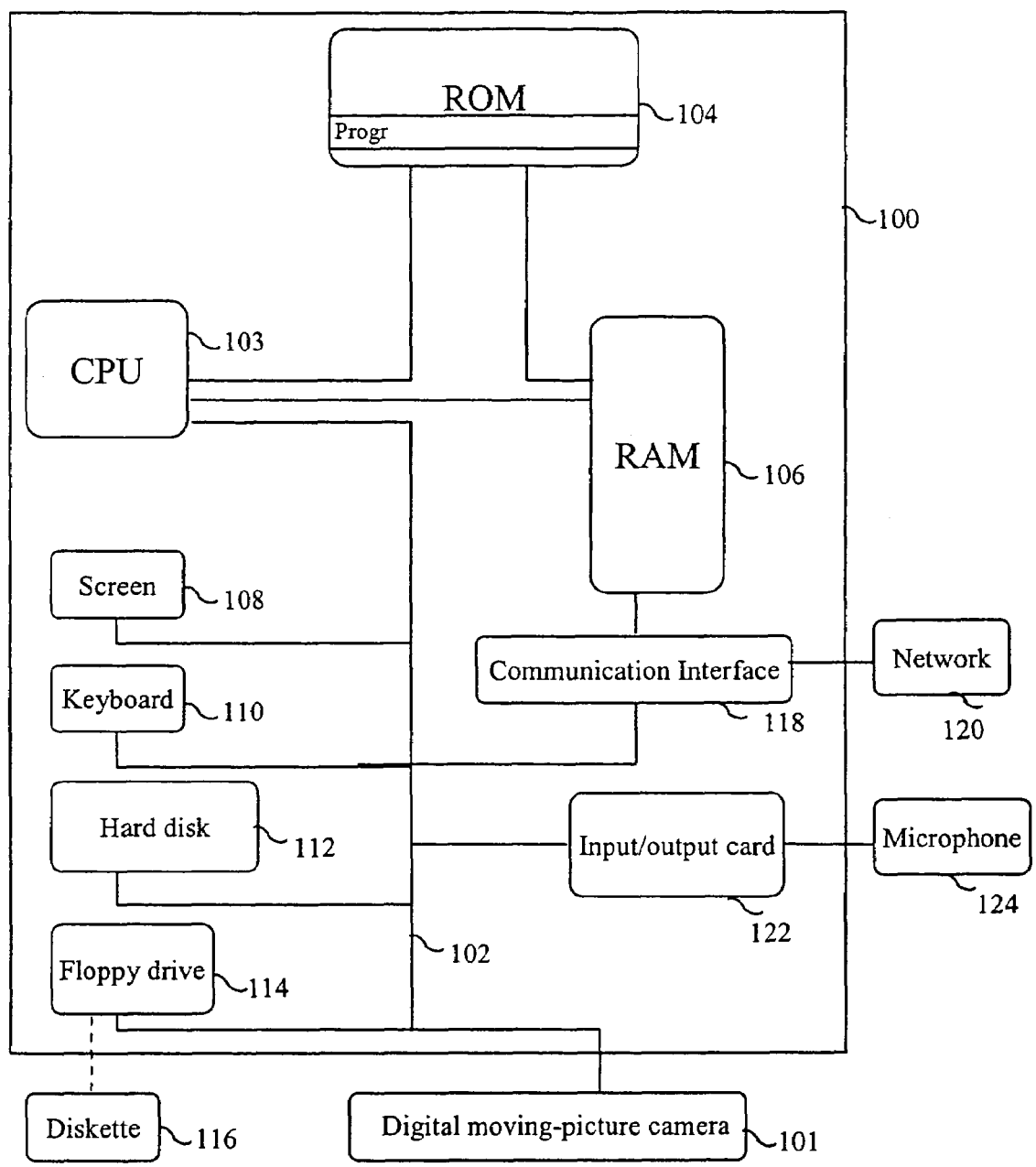
FIG. 2 is a diagram of a communication apparatus (client machine) in which the invention is implemented.

With reference to FIG. 2, an example of a programmable apparatus 100 implementing the invention is described. This apparatus is adapted to select the data of a compressed digital signal which are sufficient to reconstitute a part of the signal specified in a user request, the signal being stored on the apparatus or on another communication apparatus.

Each communication apparatus of FIG. 1 or a single of them is, for example, in the form of the apparatus of FIG. 2 which includes a device according to the invention, that is to say it has all the means necessary for the implementation of the invention (means for determining a level of granularity, means for selecting data, means for comparing, means for storing in memory of the transmitted or received selected data, and means for transmitting/receiving), or itself constitutes such a device according to the invention.

According to the embodiment shown in FIG. 1, a device implementing the invention is for example a computer or microcomputer 100 connected to different peripherals, for example a digital camcorder 101 (or a scanner, or any means of acquiring or storing an image) connected to a graphics card and supplying data.

The apparatus 100 of FIG. 2 comprises a communication bus 102 to which are connected:

a central processing unit 103 (microprocessor),
a read-only memory 104, comprising a program "Progr" enabling the programmable apparatus to implement the invention (although a single program is identified, it is possible to have a plurality of programs or subprograms to implement the invention),
a random access memory 106, comprising registers adapted to record variables modified during the execution of the aforementioned program,
a screen 108 making it possible to view the uncompressed data (in the case of the client machine) or serving as an interface with the user, who can parameterize certain modes of operation of the server or of the client machine as may be the case, using a keyboard 110 or any other means, such as a mouse,
a hard disk 112,
a floppy drive 114 adapted to receive a diskette 116,
an interface 118 for communication with a communication network 120 which may be the network 34 of FIG. 1 and which is adapted to receive requests coming from other communication apparatuses and/or information on the data which those apparatuses have received previously and to transmit selected compressed digital data in response to those requests or to transmit commands or requests to other apparatuses and to receive selected compressed data,
an input/output card 122 connected to a microphone 124 (the data to be processed according to the invention in that case constitute an audio signal).

The communication bus affords communication between the different elements included in the microcomputer 100 or connected to it. The representation of the bus is non-limiting and, in particular, the central processing unit is able to communicate instructions to any element of the microcomputer 100 directly or by means of another element of the microcomputer 100.

According to a first variant, the diskette 116, like the hard disk 112, may contain data that are compressed and stored as well as the code of the invention (program "Progr") which, once read by the apparatus 100, will be stored on the hard disk 112.

In a second variant, the program can be received in order to be stored in an identical fashion to that described previously via the communication network.

The diskettes can be replaced by any information carrier such as a CD-ROM or a memory card. In general terms, an information storage means, which can be read by a computer or microprocessor, integrated or not into the apparatus, and which may possibly be removable, stores a program implementing the method according to the invention.

In more general terms, the program can be loaded into one of the storage means of the apparatus 100 before being executed.

The central processing unit 103 will execute the instructions relating to the implementation of the invention, which are stored in the read-only memory 104 or in the other storage means. On powering up, the programs or programs which are stored in a non-volatile memory, for example the ROM 104, are transferred into the random access memory RAM 106, which will then contain the executable code of the invention, as well as registers for storing the variables necessary for implementing the invention.

It should be noted that the communication apparatus capable of implementing the invention can also be a programmed apparatus.

Figure 3:
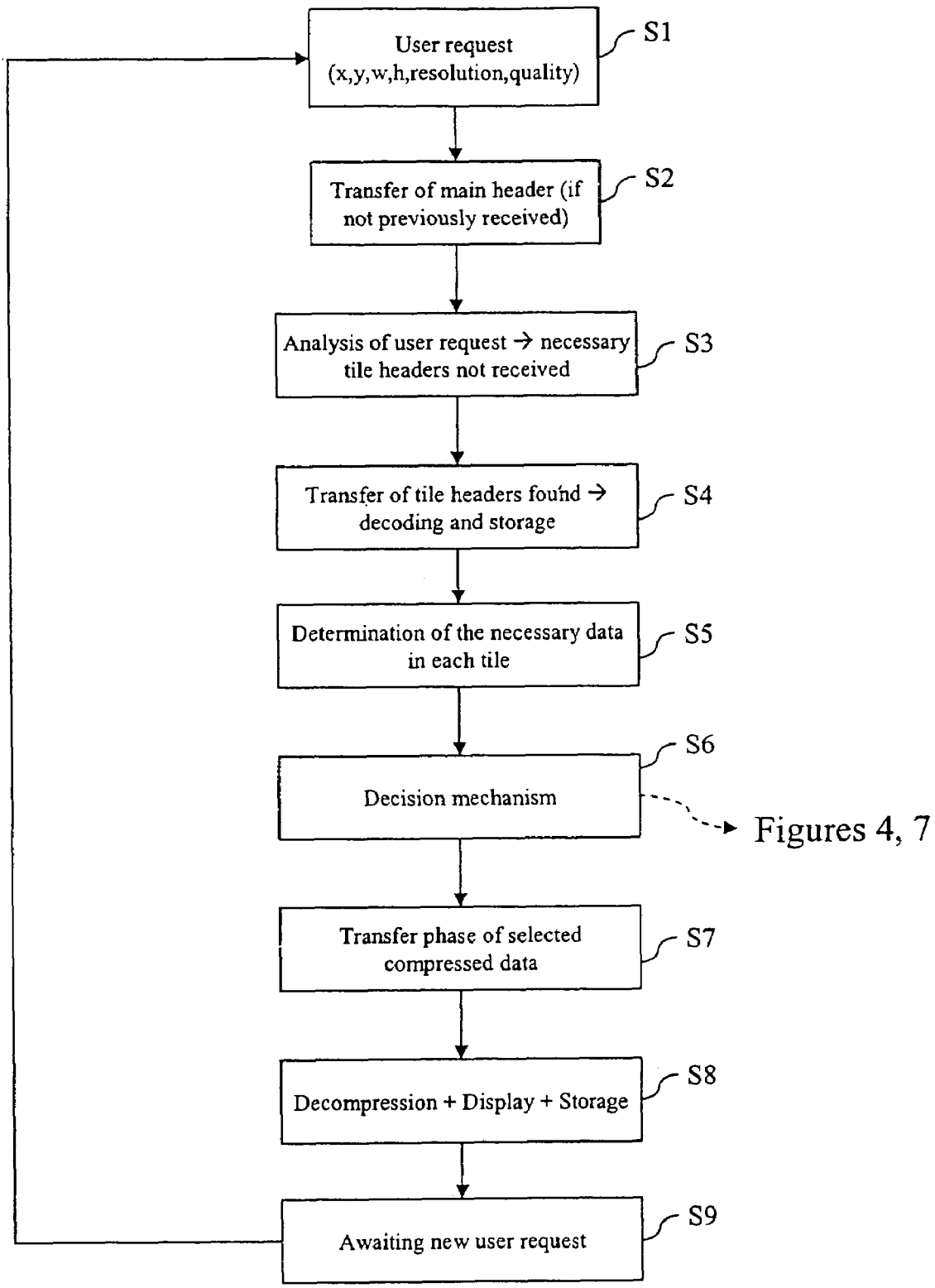
FIG. 3 is an algorithm illustrating the behavior of the client machine of FIG. 1 in which the invention is implemented.

FIG. 3 illustrates an algorithm comprising different instructions or portions of software code corresponding to steps of the method according to the invention which are implemented by the client machine 32 of FIG. 1.

The computer program "Progr" stored on the apparatus of FIG. 2 is in part based on that algorithm which, when executed by the central processing unit of that apparatus, enables the method according to the invention to be implemented.

The algorithm represented in FIG. 3 illustrates a first embodiment of the invention in which the client has the responsibility of determining the compressed data which are necessary to satisfy the user's requests and which will be transmitted to it later by the server.

The algorithm comprises a first step S1 of processing the user request which specifies a region of interest or part of the image signal to receive, to uncompress and to display.

It will be noted that this request specifies the position (x, y) and size (length w, height h) of the region of interest desired as well as the levels of resolution and of quality desired.

As soon as the analysis of that request has been carried out, the following step S2 provides for the client machine to send the server a request to receive the main header of the compressed digital image signal available on the server, if the client machine has not received that header on processing of a previous user request.

The following step S3 provides for receiving the main header of the image signal and to analyze it, or else solely to analyze it if that header had previously been received.

The analysis of that main header provides different information and in particular that of the possible division into tiles of the image signal.

Based on that information and on the analysis made of the user request, the client machine deduces which tiles are concerned by the part of the signal or region of interest desired by the user.

If the client machine does not have those tile headers in its cache memory, it transmits a request to the server with a view to retrieving them at the following step S4 in order to be able to later proceed with their decoding and with their storage in cache memory.

During the following step S5, provision is made to determine in each tile of the image signal and in each resolution level less than or equal to the resolution level indicated in the user request, the set of data necessary for the reconstruction, by the client machine or by another apparatus communicating with the latter, of the part of the signal requested by the user.

The algorithm next comprises a step S6 which relates to a decision mechanism aiming to determine, for each tile concerned by the desired part of the signal, the set and type of the compressed data which the client machine desires to receive.

More particularly, type of data is understood to mean the level of spatial granularity of that data, that is to say, for example, the data constituting a tile and/or a grouping of a plurality of code-blocks termed precinct and/or one or more code-blocks.

As illustrated in FIG. 3, step S6 makes reference both to FIG. 4 which illustrates the principle of the decision mechanism according to the invention, as well as to FIG. 7 which details, in an example embodiment, the different operations executed under that decision mechanism and which will be described later.

Figure 4:
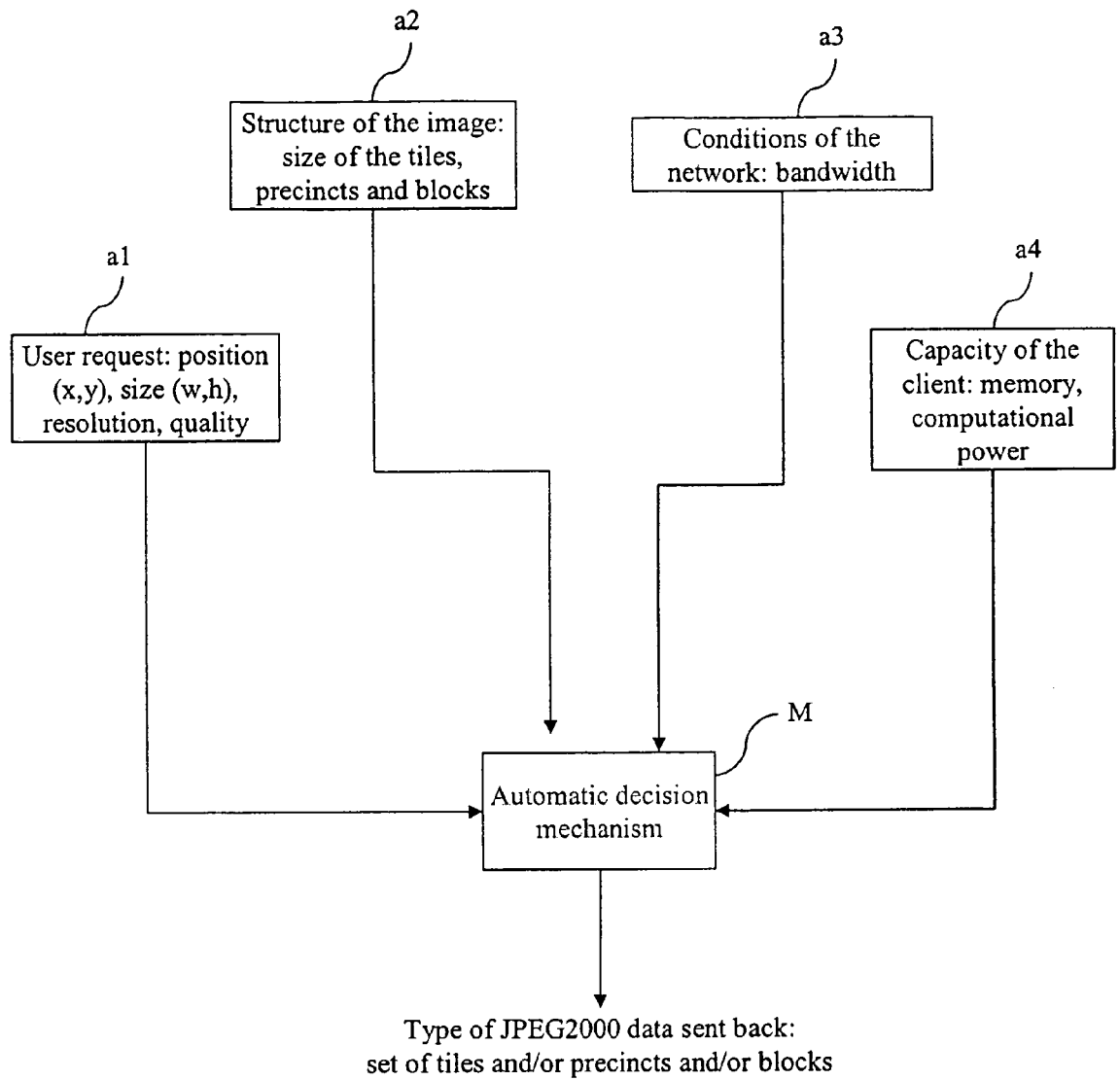
FIG. 4 is a diagram of the decision mechanism implemented by the invention.

As shown in FIG. 4, the decision mechanism applied in the invention is based on at least two criteria which are on the one hand the user request in terms of position (x, y) of the part of the signal requested, its size (w, h), its desired level of resolution and quality (criterion $a_1$), and on the other hand the structure and organization of the data in the signal, that is to say for example the size of the tiles, precincts, and code-blocks (criterion $a_2$).

The decision mechanism may also rely on one or more other criteria such as one or more characteristics of the communication network, that is to say for example the available bandwidth (criterion $a_3$).

Another chosen criterion may correspond to one or more characteristics of the client machine and/or of the server, that is to say for example the memory capacity of the client machine and/or its computational power (criterion $a_4$).

As a function of this or these different criteria, the mechanism denoted by the letter M makes it possible to select data and the level or levels of spatial granularity of that data which the client machine must receive.

Returning to the algorithm of FIG. 3, step S6 is followed by a step S7 during which the set of the compressed data which have been selected according to the invention by the client machine are received from the server.

During the following step S8, the client machine performs the operations of decompression, display and storage of the data so received.

The algorithm of FIG. 3 terminates with a step S9 of awaiting a new user request.

It should be noted that the invention applies equally in the case in which the client machine receives a user request coming from a remote apparatus.

Figure 5:
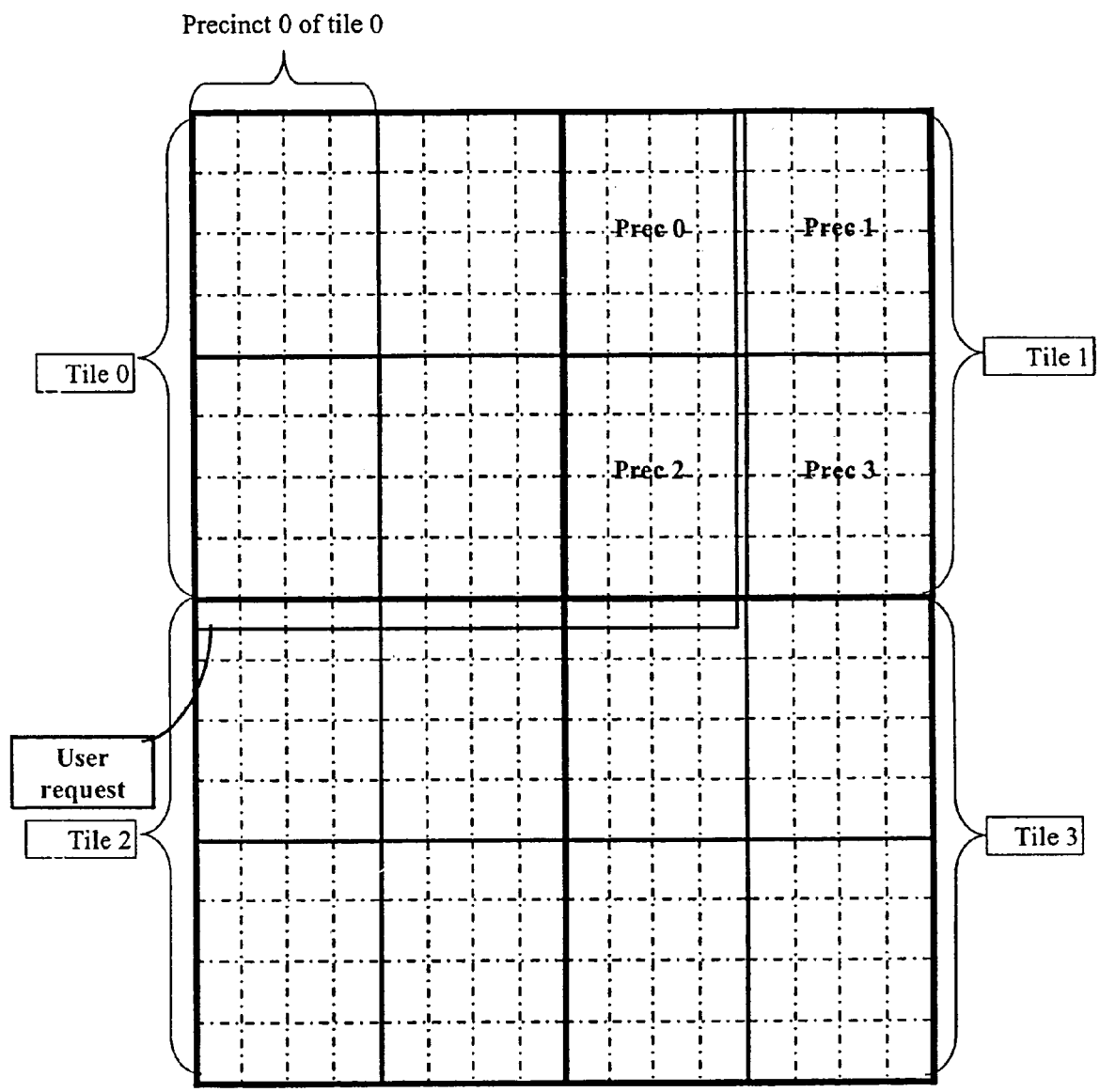
FIG. 5 illustrates the problem at the origin of the invention in a diagrammatic representation in two dimensions of an image signal decomposed into tiles, precincts and code-blocks.

FIG. 5 represents an image signal partitioned into four tiles and, for each of those tiles, the same frequency sub-band b, at the same resolution level r.

Each tile is decomposed into four precincts which themselves comprise a plurality of blocks of data (known as code-blocks according to the JPEG2000 standard). It should be noted that the tiles, the precincts and the code-blocks constitute different levels of spatial granularity of the image signal.

The precincts are separated from each other by continuous lines whereas the code-blocks are separated from each other by dashed lines.

In FIG. 5, a user request has also been represented which entirely covers tile 0 and partly covers tiles 1, 2 and 3.

The illustration of this request highlights the fact that the quantity or the volume of compressed data which is necessary to satisfy that request may vary considerably from one tile to another.

Thus, to satisfy the request, the entirety of the precincts relating to tile 0 and corresponding to the desired resolution level are necessary.

By contrast, in relation to tile 1, it appears that solely the precincts denoted 0 and 2 in FIG. 5 are necessary to satisfy the user request.

For tiles 2 and 3, it appears possible to satisfy the user request by requesting only the retrieval of the code-blocks concerned, with a view to a solution aiming to reduce occupation of the bandwidth.

However, taking into account various criteria illustrated in FIG. 4, it may prove possible for the client machine, under certain conditions, to receive more data than the minimum required to reconstruct the part of the signal desired by the user.

This is for example possible in particular when the available bandwidth on the communication network is sufficiently great and when the capacities of storage and/or computation of the client machine are not too limited.

It should be noted moreover that it is possible for the length in terms of bitstream of the precincts which are partly covered by the user request not to be much greater than the total length of the code-blocks which are included in those precincts and which would be sufficient to satisfy the user request.

Thus, in one of the aforementioned cases, as a function of the criteria applied, it may prove worthwhile to transmit complete precincts rather than code-blocks, including as regards tiles 2 and 3 of the image signal.

This is because the transfer of complete data packets corresponding to precincts has advantages.

Precincts constitute portions of bitstream which may be decompressed independently from each other. On the contrary, to be able to decompress code-blocks received individually, the client machine must first of all receive and decompress the header or headers of the data packets in which the code-blocks considered are contained.

Moreover, in that the precincts constitute contiguous portions of bitstream, their extraction from the compressed signal requires fewer operations on the part of the server.

The transfer of complete packets constituting data precincts thus appears more natural and less complex in terms of operations carried out by the client machine and by the server.

When the criterion relating to the conditions of transmission over the communication network is also made to apply, that is to say for example the available bandwidth, it is appropriate to establish a compromise between that criterion and the one relating to the complexity of processing of the data on the client machine and/or on the server as regards the choice of the levels of spatial granularity which the code-blocks and the data precincts constitute.

Figure 6:
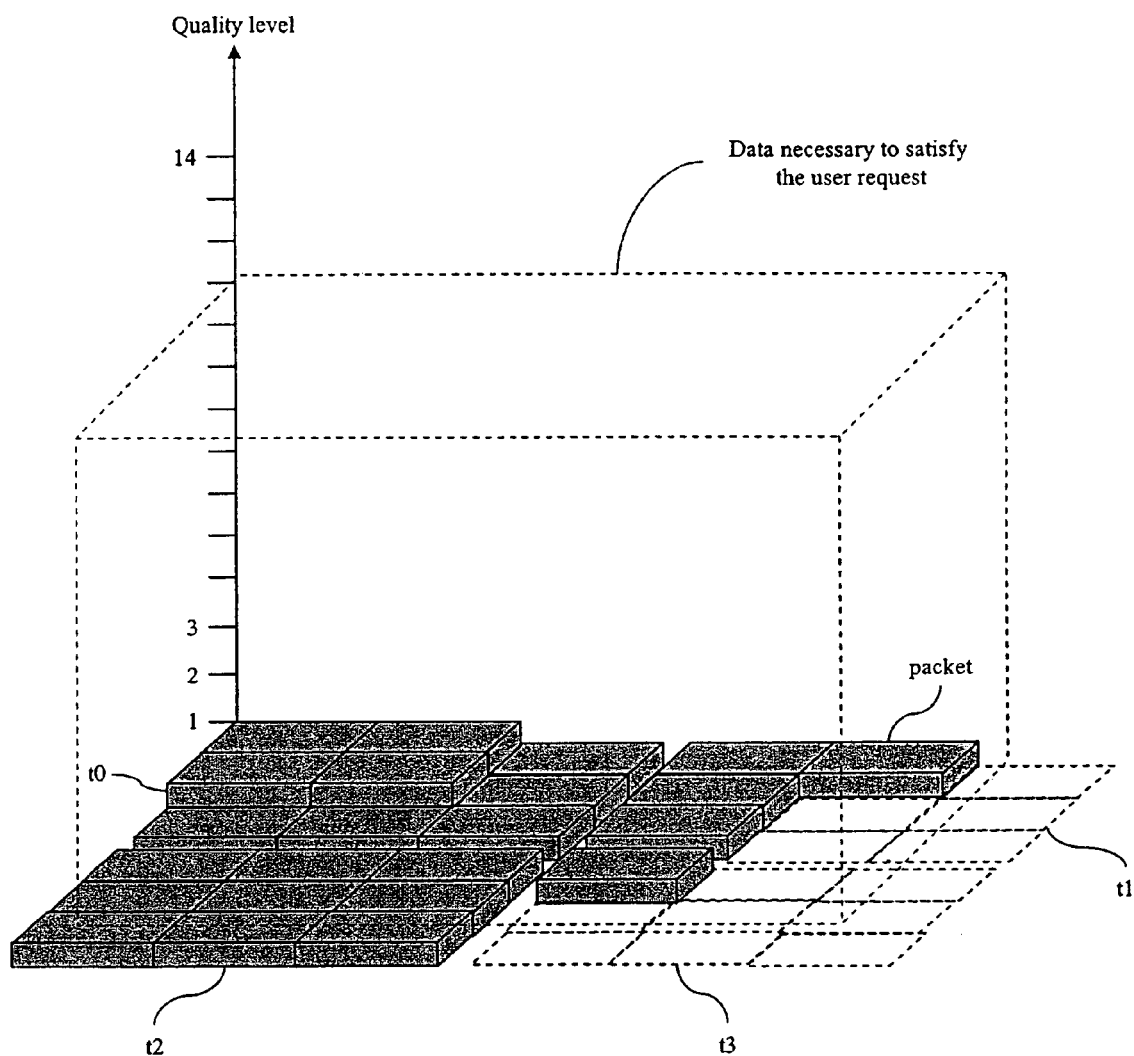
FIG. 6 is an illustration in three dimensions of the set of compressed data necessary to reconstitute the part of an image signal specified in a user request and the data already present in the cache memory of the client machine.

FIG. 6 is a three-dimensional representation of the set of the compressed data which are necessary to reconstitute the region of interest desired by the user.

In that Figure, the image signal of FIG. 5 decomposed into four tiles $t_0$, $t_1$, $t_2$ and $t_3$ have been represented for a particular resolution level.

For each of the tiles of the image signal, FIG. 6 illustrates for each precinct of each tile the data packet or packets already stored in the cache memory of the client machine.

A vertical axis, indicating the quality levels present in the original image signal available on the server, has been represented in that Figure in order to highlight the different quality levels already received by the client machine for each of the precincts constituting each tile.

The different packets or quality levels already received for different precincts are represented in FIG. 6 by solid parallelepipeds.

The set of the compressed data necessary to satisfy the user request in the resolution level considered for the tiles $t_0$ to $t_4$ of the image signal is illustrated in the form of a volume delimited by dashed lines.

Through the difference with respect to the set of full parallelepipeds embodying the data already received, this Figure shows the set of compressed data necessary and not received to satisfy the user request.

In order to take a decision about the data which will later be transmitted from the server to the client machine, each quality level of the image signal is gone through from the basic level to the level specified by the user request, and, in each level, the proportion of data necessary and not received (missing precincts) within each tile is determined.

As a function of the proportion so determined, a decision is then taken as to whether it is appropriate to later transfer the entire quality level of the tile considered or solely the precincts missing in that tile for that resolution level.

Figure 7:
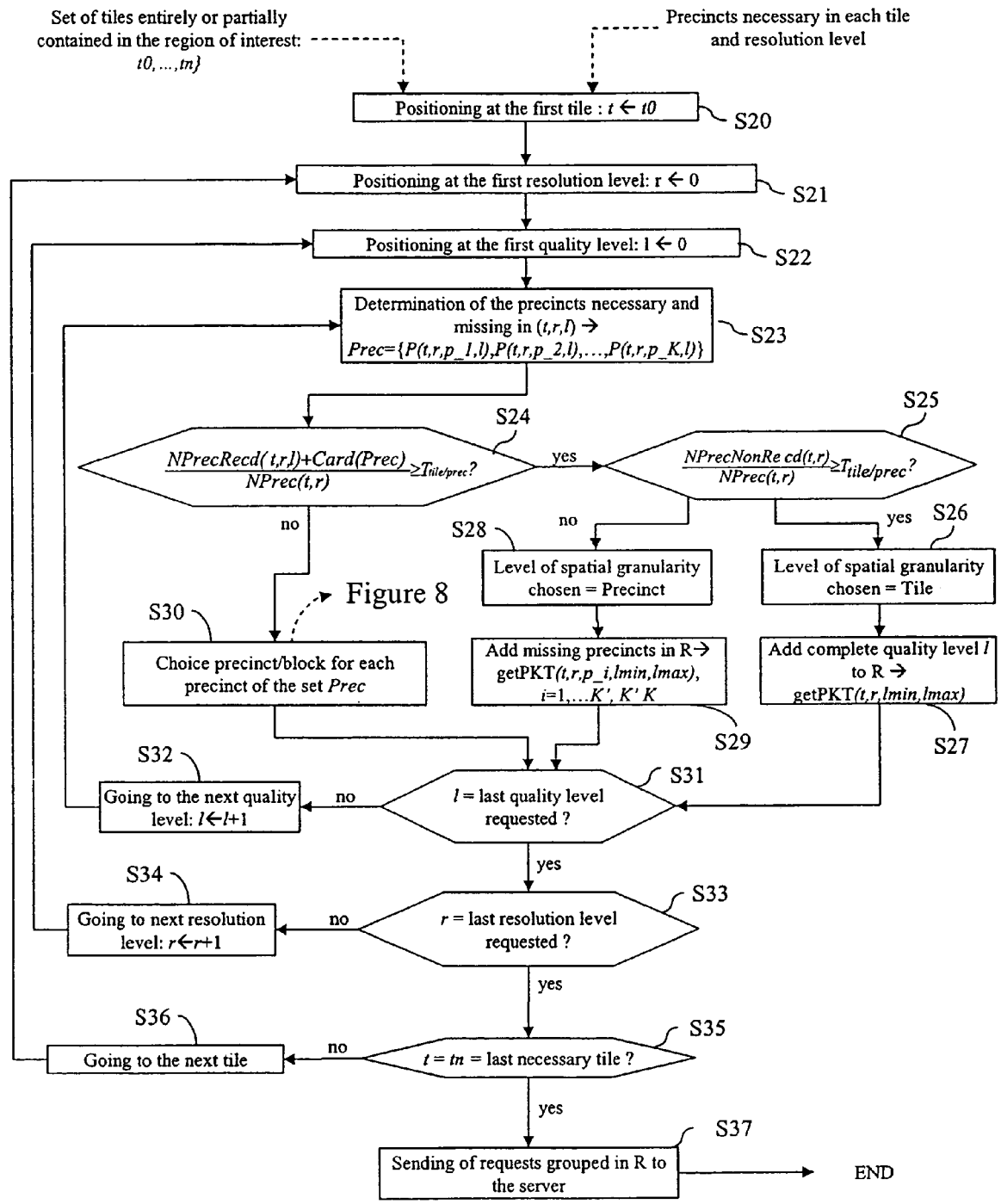
FIG. 7 is an algorithm implemented by the second communication apparatus (client machine) and which concerns the selection of data of a signal by that apparatus according to a first embodiment of the invention.

FIG. 7 illustrates an algorithm comprising different instructions or portions of software code corresponding to steps of the method of selecting data according to a first embodiment of the invention.

The computer program which is based on that algorithm is stored in the apparatus of FIG. 2 and executed by the central processing unit of that apparatus to implement the method.

This program forms part of the program "Progr" mentioned earlier with reference to FIG. 2.

For its execution, the algorithm of FIG. 7 takes into account the set of the tiles which are entirely or partially contained in the part of the signal (region of interest) desired by the user and specified in the user's request and which are denoted $t_0 \ldots t_n$. The tile constitutes the first level of spatial granularity of the image signal also termed upper level of spatial granularity.

In this algorithm are also taken into account the precincts necessary in each tile and for each resolution level. The precinct constitutes the second level of spatial granularity of the signal which is a lower level of spatial granularity.

The algorithm of FIG. 7 commences with a step S20 during which the client machine goes to the first tile $t_0$.

During the following step S21 it is provided to go to the first resolution level r=0.

The next step S22 then provides to go next to the first quality level l=0.

For the tile t, the resolution level r and the quality level l considered, the client machine next determines during the step S23 the set of the precincts or data packets which are necessary to satisfy the user request and that have not yet been received by the client machine.

In this connection, it should be noted that at a given quality level l, a precinct corresponds exactly to a data packet (full parallelepiped in FIG. 6).

The set so determined of the missing data is denoted Prec={P(t,r,p_1,l),P(t,r,p_2,l), . . . ,P(t,r,p_K,l)}.

During that step, the data are thus taken into account which have been received previously by the client machine with respect to other requests and which are stored in its cache memory.

The algorithm next comprises a step S24 during which a comparison is carried out indicating a proportion of data of a given level of spatial granularity with respect to a predetermined threshold.

The ratio calculated is that of the sum of the number of precincts already present on the client machine (Prec) plus the minimum number of precincts to receive by the client machine to reconstitute the region of interest, to the total number of precincts present in the signal for the current resolution level.

This is what is illustrated in FIG. 6 for the tile $t_3$ for which the total number of precincts is equal to nine, one precinct having already been received and five precincts requiring to be received. The ratio is thus equal to 6/9.

For this first test, the quantity of data for the second level of spatial granularity (precinct) is used.

It will be noted that the predetermined threshold denoted $T_{tile/prec}$ is representative of the characteristic or characteristics of the communication network and/or of the characteristic or characteristics of the client machine and/or of the server.

For the example considered, in case of low bandwidth available or of low memory capacity of the client machine, it will be sought to reduce as much as possible the quantity of compressed data which are transmitted from the server to the client machine.

In such a case, the threshold $T_{tile/prec}$ will have a fixed value close to 100% and for example equal to 90%.

On the contrary, when the conditions of exploitation of the communication network and the memory capacity of the client machine permit a high rate of transmission, then the $T_{tile/prec}$ is fixed at a low value which is for example equal to 70%.

It will be noted that the threshold value varies as a function of the client machines and may possibly be modified over time.

According to one variant, the threshold may increase with the index of the quality level and/or resolution level considered.

Furthermore, it will be noted that, for low resolution levels, less account will be taken of the characteristic or characteristics of the network and/or of the client machine and/or of the server than at higher resolution levels. This is because the proportion of data which are necessary with respect to the available data is higher in the low resolution levels.

On the other hand, for the highest resolution levels, the characteristic or characteristics of the network and/or of the client machine and/or of the server will have greater influence and the efficiency of the data transfer will depend more on the determined level or levels of spatial granularity.

As a function of the result of the comparison performed at step S24, it will be decided later, either to select a superset of data with respect to the set of data necessary and not yet received by choosing between the first and the second level of spatial granularity (steps S25 to S29), or by performing another test (step S30 and steps S40 to S51 of FIG. 8).

During this other test (second test) a ratio using a proportion of data of a hierarchically lower level of spatial granularity to that of the data of the test of step S24, will be compared to a threshold.

When the result of the comparison carried out at step S24 turns out to be positive, that is to say that the ratio defined above is greater than the predetermined threshold, the following step S25 is proceeded to.

During this step, another comparison is made with respect to a predetermined threshold which may, for example, be the same as the threshold $T_{tile/prec}$, of the ratio of the total number of precincts not received in the current quality layer, to the total number of precincts present in the current resolution level.

It will be noted that the set of the precincts not received also comprises precincts which are not covered by the user request.

The content of the superset of data and thus the level of spatial granularity which will be determined depend on the result of this second comparison.

When the aforementioned ratio is greater than the threshold, step S25 is followed by a step S26 during which at least one level of spatial granularity of data is determined as a function of the region of interest desired by the user and of the structure and organization of the data in the signal.

In the example considered, the level of spatial granularity determined will correspond to the complete tile, even if the data constituting that tile have already been received previously.

In the case of the tile $t_3$ it is indeed possible to retrieve the set of data constituting that tile despite the fact that a precinct represented by the full parallelepiped in FIG. 6 is already stored in cache memory of the client machine.

Step S26 is followed by a step S27 during which data are selected corresponding to the level of spatial granularity so determined as a function of the region of interest and of the structure and the organization of the data in the signal.

This solution has the advantage of reducing the number of commands to transmit to the server, thus aiming to simplify the transfer of data in the communication architecture considered.

It will be noted that when it is decided to retrieve from the server to the client machine the set of the data packets corresponding to the quality level l considered, the request or command specifying the complete current quality level is added to the set R of the requests to transmit to the server.

For this, updating is performed of the interval of complete quality levels [lmin, lmax] which will be requested by the client machine from the server.

If the current quality level l is less than lmin, the value lmin takes the value of the current quality level l. If the value of the current quality level l is greater than lmax, lmax takes the value l.

Thus, at the end of the execution of the algorithm, an interval [lmin, lmax] will be possessed of quality levels which are to be retrieved in their entirety in the current resolution level.

Returning to step S25, when the result of the comparison is negative, that step is followed by a step S28 during which at least one level of spatial granularity of data is determined as a function of the region of interest desired by the user and of the structure and organization of the data in the signal.

In the example considered account is taken of the level of spatial granularity constituted by the data precincts.

During the following step S29 provision is made to select the data of that level of spatial granularity determined as a function of the region of interest and of the structure and organization of the data in the signal.

The data so selected constitute a superset of data with respect to the set of data necessary and not yet received to satisfy the request.

Nevertheless, taking account of the result of the comparison made at step S25, the superset so determined at step S29 will be less voluminous than that determined at step S27 since it will consist solely of the set of the packets constituting the precincts missing in the current quality level and not that quality level in its entirety.

During the steps S25 to S29 the level of granularity of the data is thus finely adapted to the communication architecture considered.

During step S29 the precincts not received covered or not by the region of interest (user request) are selected.

The requests or commands each specifying data packets constituting missing precincts in the current quality level are thus added to the set R of the requests or comments to transmit to the server.

For each of these precincts the updating is then proceeded with of its interval [lmin, lmax] of quality levels to retrieve by the client machine.

This updating of the interval of quality levels to retrieve for each precinct is identical to the updating set out above for the complete quality levels and will thus not be repeated here.

Returning to step S24, when the result of the comparison is negative this step is followed by a step S30.

During this step which will be described later with reference to the algorithm of FIG. 8, a choice is made of the level of granularity of the data to transmit, between the packets which contribute to the missing precincts and one or more code-blocks within those precincts.

It will be noted that the code-blocks constitute a third level of spatial granularity of data in the signal.

It should be noted that when the result of the comparison made at step S24 is negative, the volume of the data to be transmitted is reduced with respect to that which it is possible to transmit in the case in which the result of the comparison is positive (S25 to S29).

At step S30 and as will be seen further on (steps S40 to S51) an even finer determination will be made of the level of spatial granularity necessary to reconstitute the region of interest. Thus the level of spatial granularity is more finely adapted to the communication architecture considered. This makes, it possible to optimize, for example, the use of the available bandwidth in the communication network by reducing the throughput of data to transmit.

On the other hand, this solution will require more operations to identify the data of a finer level of spatial granularity.

When one of the aforementioned steps S27, S29, S30, has been carried out the step S31 is proceeded to which performs a test on the current quality level.

If the current quality level does not correspond to the last quality level requested by the user in his request, step S31 is followed by the step S32 which increments the current quality level by one unit and the latter step is followed by step S23 already described above.

On the contrary, when the current quality level corresponds to the last quality level requested by the user, step S31 is followed by the step S33 during which a test is performed on the current resolution level.

When the current resolution level does not correspond to the last resolution level requested by the user in his request, that step is followed by a step S34 which provides for incrementing the current resolution level by one unit.

That step is then followed by step S23 which has already been described above.

When the current resolution level corresponds to the last resolution level requested by the user, step S33 is followed by a step S35 which carries out a test on the current tile.

Should the, current tile not correspond to the last tile necessary to satisfy the request, that step is followed by a step S36 which provides for passing on to the next tile that has not yet been processed.

That step is then followed by step S21 which has already been described above.

On the contrary, when the last tile concerned by the region of interest has been processed, step S35 is followed by a step S37 which provides for transmitting to the server each request or command of the set R and which specifies the data of different levels of spatial granularity necessary to the client machine. The algorithm of FIG. 7 is then made to terminate.

It will be noted that each request or command grouped together in the set R of the requests transmitted to the server specifies the selected data corresponding to a determined level of spatial granularity.

Figure 8:
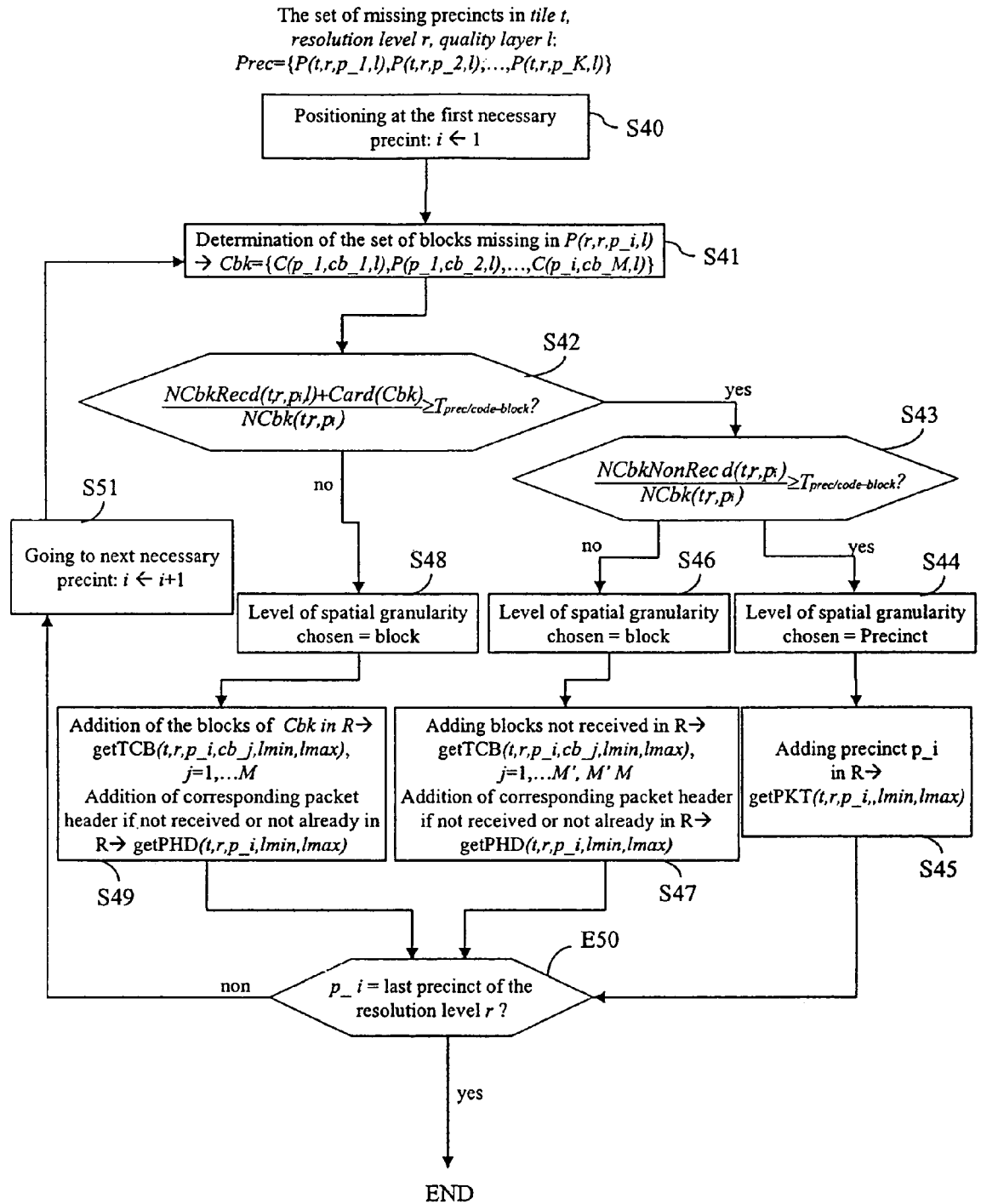
FIG. 8 is an algorithm detailing the operations carried out at step S30 of the algorithm of FIG. 7.

FIG. 8 illustrates the algorithm detailing the different operations performed during step S30 of the algorithm of FIG. 7.

More particularly, this algorithm contains different instructions or portions of software code corresponding to steps of the method of selecting data according to the invention.

The computer program which is based on this algorithm is stored in memory in the apparatus of FIG. 2 and forms part of the program "Progr".

The algorithm of FIG. 8 illustrates a mechanism of deciding between the choice of a transfer of complete precincts (second level of spatial granularity) or else of a plurality of code-blocks (third level of spatial granularity) belonging to those precincts.

For the execution of this algorithm the case will be taken in which the set of spatial groups necessary and not received in the current tile t, for the current resolution level r and for the current quality level l, has been determined at step S23 of the algorithm of FIG. 7.

In the current quality level l, the algorithm of FIG. 8 goes through the set of precincts not received and which contribute to the region of interest of the signal to be decompressed and displayed.

To do this, the algorithm commences by a first step S40 which provides for going to the first necessary precinct denoted by the index i initialized with the value 1.

During the following step S41 it is provided to determine for that precinct the set of code-blocks which are necessary to decompress the region of interest of the requested signal and which have not been received by the client machine.

This set is denoted Cbk and is written in the following manner:

$$Cbk=\{C(p\_i,cb\_1,l),P(p\_i,cb\_2,l),\ldots,C(p\_i,cb\_M,l)\}$$

Step S41 is then followed by a step S42 which performs a comparison of a given ratio with respect to a predetermined threshold denoted $T_{prec/code-block}$.

This ratio is equal to the sum of the number of code-blocks already received plus of the number of code-blocks to be received and which are necessary to reconstitute the region of interest, to the total number of code-blocks present in the current precinct.

This ratio is written in the following manner.

$$\frac{Card(Cbk) + NCbkRecd(t, r, p_i, l)}{NCbk(t, r, p_i)}.$$

As a function of the result of the comparison provided at step S42 it will later be decided either to select a superset of data with respect to the set of data necessary and not yet received, or solely that set.

The threshold $T_{prec/code-block}$ is fixed as a function of the same conditions as the threshold $T_{tile/prec}$ of steps S24 and S25.

When the result of the comparison provided at step S42 is positive, it will be decided to retrieve the current precinct in its entirety (second level of granularity) or else the set of code-blocks not received (third level of granularity) in order for that precinct to be available in it entirety on the client machine.

In both cases, a superset of data with respect to the set of data defined at step S41 is concerned.

The choice between these two possibilities depends on the result of the comparison performed at step S43.

During that step, it is provided to compare to a threshold, for example the same as that of step S42, the ratio of the number of code-blocks not received with respect to the total number of code-blocks in the current precinct.

When that ratio is greater than the value of the threshold, it is then decided, during the course of the following step S44, that the level of spatial granularity of data will be the precinct which will be retrieved in the form of a complete data packet.

It will be noted that the complete retrieval of the current precinct may lead to receiving code-blocks that are already present in the cache memory of the client machine.

During the following step S45, it is provided to select the data corresponding to the level of granularity so determined.

The selection of this data is made by formulating an appropriate request or command and by inserting it in the set R of the requests or commands which will be transmitted later to the server.

For this, updating is performed of the interval of quality levels [lmin, lmax] which is associated with the current precinct in an identical manner to that performed for the execution of the algorithm of FIG. 7.

When the result of the comparison carried out at step S43 indicates that the ratio is less than the threshold value, then that step is followed by a step S46 which provides for the level of spatial granularity determined to be the code-block (third level of granularity).

In that case, the code-blocks of the current precinct which have not been received will be retrieved onto the client machine.

The following step S47 provides for selecting for the level of spatial granularity so determined of the data as a function of the region of interest, of the structure and of the organization of the data in the signal.

To do this, a request or command is formulated specifying the header of the corresponding data packet, if that header is not available in the cache memory of the client machine, and requests or commands specifying the contributions of the different missing code-blocks in the body of the packet constituting the current quality level of the current precinct.

For this, an update is carried out of the interval of quality levels associated with each missing packet header and code-block in a similar manner to that previously explained for the precinct requests.

Next there are inserted in the set R of the requests or commands to transmit to the server both the request specifying the corresponding packet header if that header has not already been received, as well as the requests specific to each of the missing code-blocks if they are not already contained in the set R.

Returning to step 42, when the result of the comparison performed at that step shows that the ratio is less than the value of the threshold, it will then be decided during the step S48 that the level of spatial granularity of data determined is the code-block (third level of granularity).

It will thus be decided to retrieve onto the client machine code-blocks that are necessary and not received of the current precinct corresponding to the set of data defined at step S41.

It is next provided at step S49 to select the data corresponding to that level of spatial granularity determined as a function of the region of interest and of the structure and organization of the data in the signal.

To do this, a request or command is formulated specifying the header of the corresponding data packet, if that header is not available in the cache memory of the client machine, and requests or commands specifying the contributions of the different missing code-blocks in the body of the packet constituting the current quality level of the current precinct.

For this, an update is carried out of the interval of quality levels associated with each missing packet header and code-block in a similar manner to that previously explained for the precinct requests.

Next there are inserted in the set R of the requests or commands to transmit to the server, both the request specifying the corresponding packet header if that header has not already been received, as well as the requests specific to each of the missing code-blocks if they are not already contained in the set R.

When one of the steps S45, S47, S49 has terminated, the following step S50 is proceeded to during which a test is performed on the current precinct considered.

When the current precinct considered does not correspond to the last precinct of the current resolution level r considered, the following step S51 is proceeded to during which the index i identifying the current precinct is incremented by one unit and that step is followed by step S41 already described above.

On the contrary, when the current precinct proves to be the last of the current resolution level r considered, the algorithm of FIG. 8 is made to terminate.

This also terminates the execution of step S30 of the algorithm of FIG. 7.

It should be noted that according to a variant, the different tests carried out at steps S24, S25, S42 and S43 may, alternatively, consist in measuring the ratio of the sum of the sizes (expressed in numbers of bytes in the original bitstream) of the of the corresponding data (precincts or code-blocks) already received by the client machine plus the data to receive and which are necessary to reconstitute to region of interest, to the total size of the data (precincts or code-blocks) present at the current quality level.

The test performed would then consists of comparing that ratio to the threshold value set as indicated below:

$$\frac{\sum_{Pkt \in (t,r,l) \text{ and already received}} Length(Pkt) + \sum_{j=1}^{K} Length(P(t, r, p\_j, l))}{\sum_{Pkt \in (t,r,l)} Length(Pkt)} \geq T_{tile/prec}$$

It will be noted that to implement such a variant embodiment, the client machine must beforehand possess packet length information of the tiles gone through.

To obtain those lengths, obtainment is made of either the pointing markers PLM or PLT present in the image signal confirming to the JPEG2000 standard and available at the server if those markers exist in the signal, or of an indexing map of the bitstream constituting the signal.

This variant embodiment would however not necessarily lead to intervals of quality levels to retrieve which are connected for the complete quality levels or the isolated precincts.

According to another variant, the client machine would retrieve a surplus of data chosen in such a manner as to approach as closely as possible a throughput budget fixed in advance, without exceeding it.

It should be noted that the set of the requests or commands which are sent by the client machine to the server at step S37 of the algorithm of FIG. 7 comprises:

requests or commands of complete quality levels of a resolution level of a tile, and/or requests or commands of data packets contributing to quality levels of particular precincts, requests for packet headers contributing to quality levels of particular precincts and requests and contributions of code-blocks to bodies of those packets.

Thus a heterogeneous set of requests is obtained.

The number of the requests to transmit to the server is reduced since the quality levels are updated for the different levels of spatial granularity so as to combine the requests of the same type.

This makes it possible to increase the efficiency of data transfer in the communication architecture envisaged.

It should be noted that the client machine cannot retrieve the data packets of a precinct at a given quality level without having retrieved the packets of the lower levels in the same precinct.

This is explained by the fact that the signal has a plurality of different quality levels which constitute in other words a hierarchical representation of quality of the data in the signal. Thus, it is not possible to decompress the data packet of a precinct at a given quality level without having decompressed the data packets of the lower quality levels of the same precinct.

In the same way, this also explains why it is decided to form intervals [lmin, lmax].

Moreover, the algorithm is designed such that for each complete quality level or each precinct, the set of the quality levels to retrieve constitutes a connected set.

It should be noted that the principles implemented in the algorithm 7 and 8 may apply to any compressed digital signal comprising more than three levels of spatial granularity.

Thus it suffices to execute the algorithm of FIG. 7 as many times as necessary moving down each time by one hierarchical level for the levels of spatial granularity concerned in steps S24 to S20.

Figure 9:
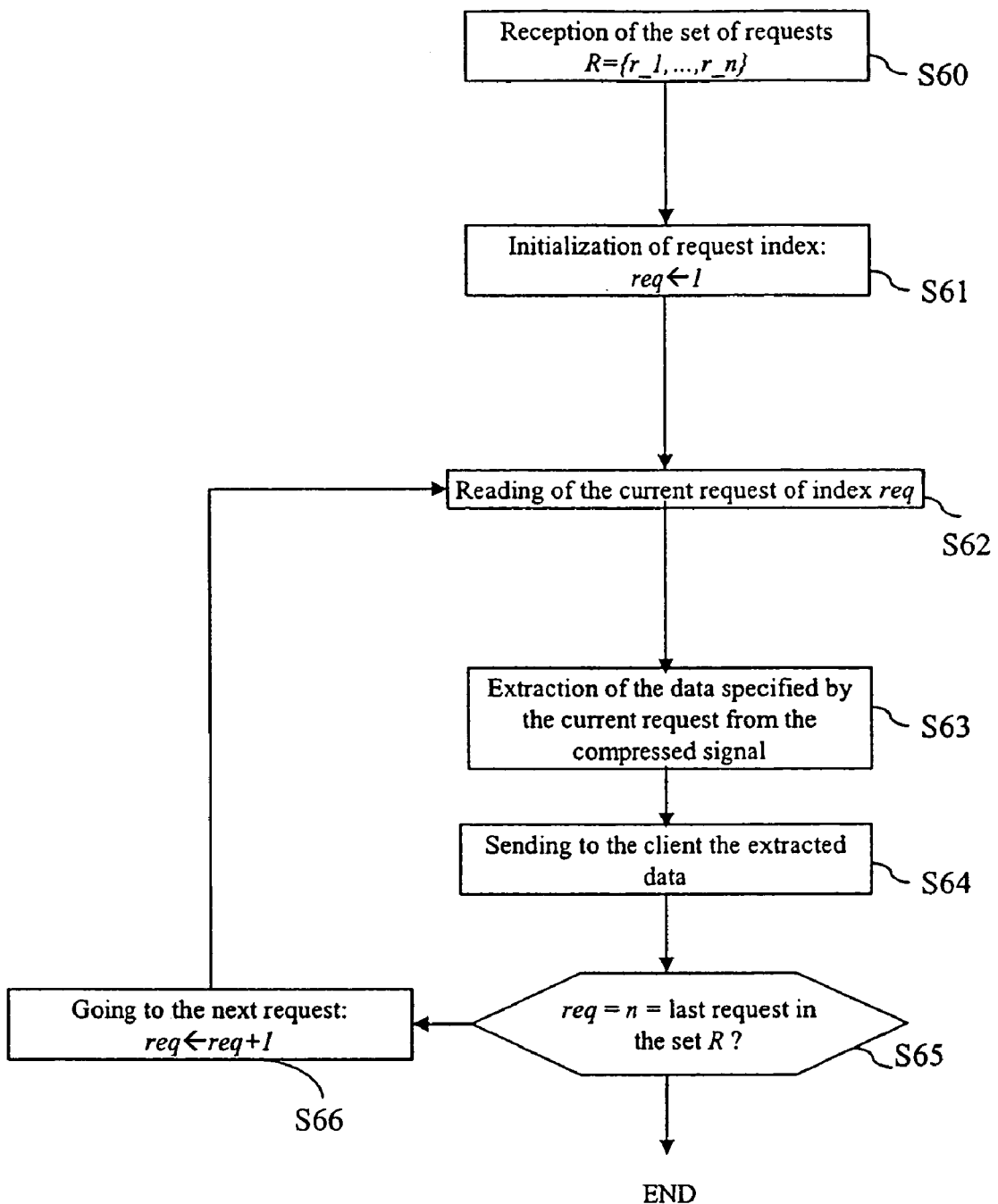
FIG. 9 is an algorithm implemented by the first communication apparatus (server) and which concerns the processing of a request transmitted by the second apparatus and specifying data of the signal to be transmitted.

FIG. 9 illustrates an algorithm detailing the different operations performed by the server in the first embodiment of the invention.

That algorithm comprises different instructions or portions of software code corresponding to steps of the method of processing the request or requests transmitted by the client machine at step S37 of FIG. 7.

The computer program based on that algorithm is stored on the server of which the structure may also be that of the apparatus of FIG. 2.

It should be noted that the processing performed by the server on the requests coming from the client machine represents a part only of the processing of the user request.

This is because in this embodiment the client machine itself performs a part of the processing of the user request, which reduces the number of tasks to carry out by the server.

The algorithm of FIG. 9 commences with a step S60 of receiving the set R of the requests or commands transmitted by the client machine.

Step S60 is followed by a step S61 which provides for initializing the index of the current request denoted "req" to the value 1.

During the following step S62 reading of the current request of index req is carried out.

During the following step S63 provision is made for extracting from the compressed digital signal the data which have been selected by the client machine and which are specified in the current request.

It should be noted that the current request concerns a determined level of spatial granularity of data.

During the following step S64 it is provided to transmit to the client machine at the origin of these requests the selected data extracted at step S63.

During the following step S65 a test is performed on the value of the index of the current request req in relation to the value n corresponding to the last request of the set R.

When the current request does not correspond to the last request of the set R, the following step S66 is proceeded to which provides for incrementing the index of the current request by one unit.

That step is followed by the step S62 already described above.

When the current request corresponds to the last request of the set R, the algorithm of FIG. 9 is made to terminate.

It should be noted that in the proposed algorithm, the data are transmitted progressively as the different requests are processed. However it should be noted that it would be possible to wait for the entirety of those requests to be processed before transmitting the data to the client machine considered.

Figure 10:
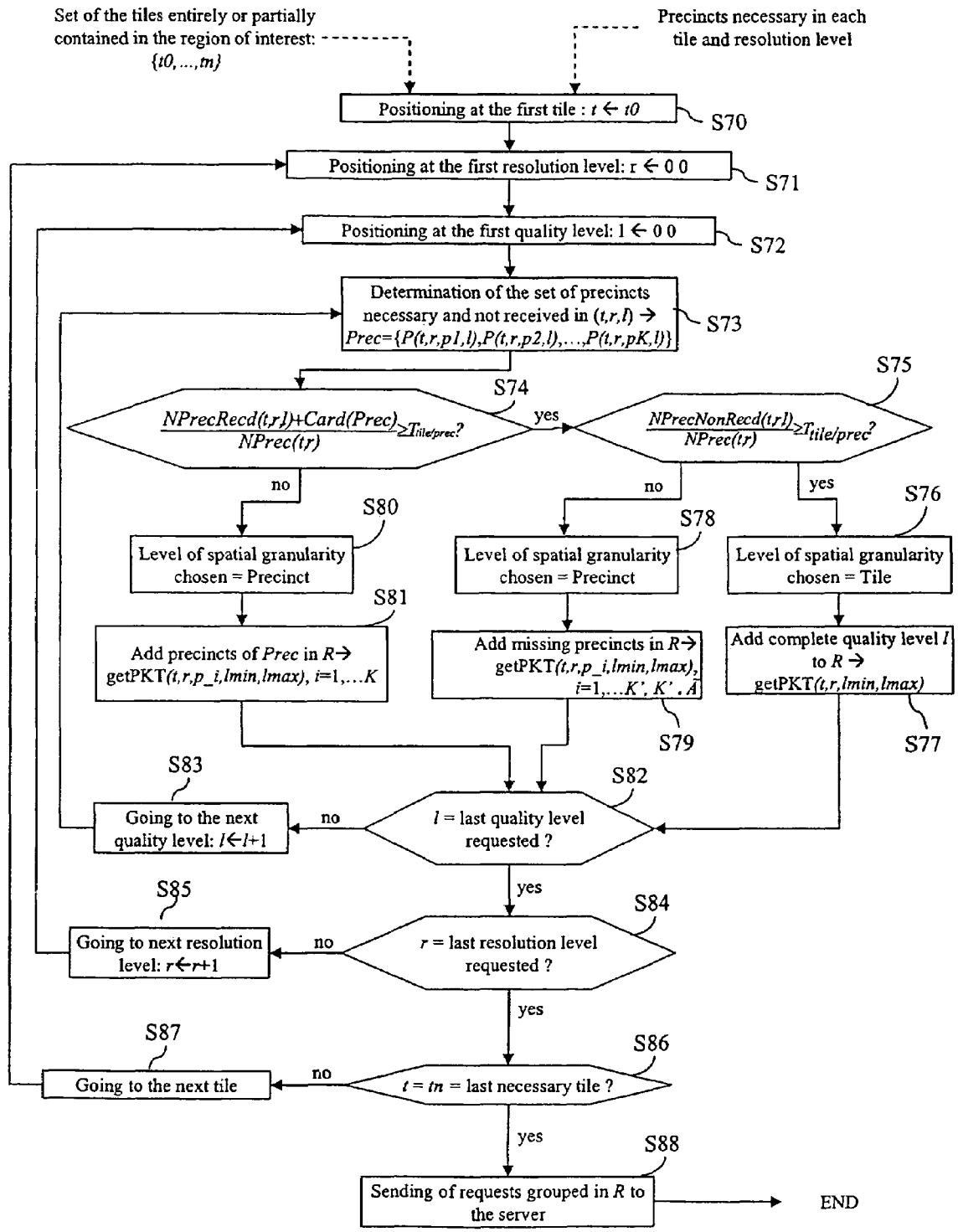
FIG. 10 is an algorithm implemented by the second communication apparatus (client machine) according to a variant embodiment of the algorithm represented in FIGS. 7 and 8.

The algorithm of FIG. 10 illustrates a variant embodiment of the algorithm of FIG. 7 in which a client machine is capable of receiving two levels of spatial granularity, i.e. tiles and precincts (packets of data) but not code-blocks.

The algorithm comprises a series of steps S70 to S73 which are identical to the respective steps S20 to S23 of the algorithm of FIG. 7 and are therefore not described again here.

Once determination has been made of the set of the precincts necessary and not received for the tile, the resolution level and the quality level considered, the algorithm comprises the test steps S74 and S75 which are identical to the tests performed during steps S24 and S25 of FIG. 7.

In an identical manner to that described for the algorithm of FIG. 7, when the test of step S75 (step S25 on FIG. 7) is performed, the steps of determining a level of spatial granularity of data and of selecting data for the determined level of granularity which are illustrated by the steps S76, S77, S78, and S79 (FIG. 10) correspond in all aspects to the steps S26, S27, S28, and S29 FIG. 7.

However, when the result of the comparison carried out at step S74 indicates that the ratio of the sum of the number of precincts already received in the client machine plus the minimum number of precincts to receive by the client machine to reconstitute the region of interest, to the total number of precincts present in the current resolution level, is less than the predetermined threshold, that step is followed by a step S80 which provides for determining the level of spatial granularity of data appropriate to the situation.

Thus, taking account of the restrictive conditions of exploitation of the client-server communication architecture (characteristics of the network and/or characteristics of the client machine and/or of the server), the determined level of spatial granularity (step S80) corresponds to the precinct and not to the tile.

During the following step S81 it is next provided to select the corresponding data for the level of spatial granularity determined at the preceding step.

To do this, the requests or commands specific to the missing precincts are formulated and are integrated into the set R of the requests or commands to transmit later to the server.

It should be noted that in the case which has just been described only selection is made of the data necessary and not received given the restrictive conditions of exploitation.

When one of the steps S77, S79, S81 is terminated, the algorithm provides a series of steps S82, S83, S84, S85, S86, S87, and S88 which are in all aspects identical to the respective steps S31, S32, S33, S34, S35, S36, and S37 of the algorithm of FIG. 7.

Consequently, these steps S82 to S88 will not be described again here.

It should be noted that this algorithm makes it possible to determine the level or levels of spatial granularity of data (tile and/or precinct) and to select the data corresponding to that or those levels in order to satisfy the user request.

Furthermore, that algorithm makes it possible to form a set of requests or commands which will be transmitted by the client machine to the server in order to later receive the selected data.

Nevertheless it will be noted that in the algorithm of FIG. 10 the client machine does not possess the request or command corresponding to the level of spatial granularity represented by the code-block as was the case in the algorithm of FIG. 7.

Although the choice between the levels of spatial granularity which the tile and the code-block constitute has not been described here, it can perfectly be envisaged to make such a choice in the course of a variant embodiment of the first embodiment of the invention.

This would prove to be useful, for example, for an image signal not partitioned into precincts.

Figure 11:
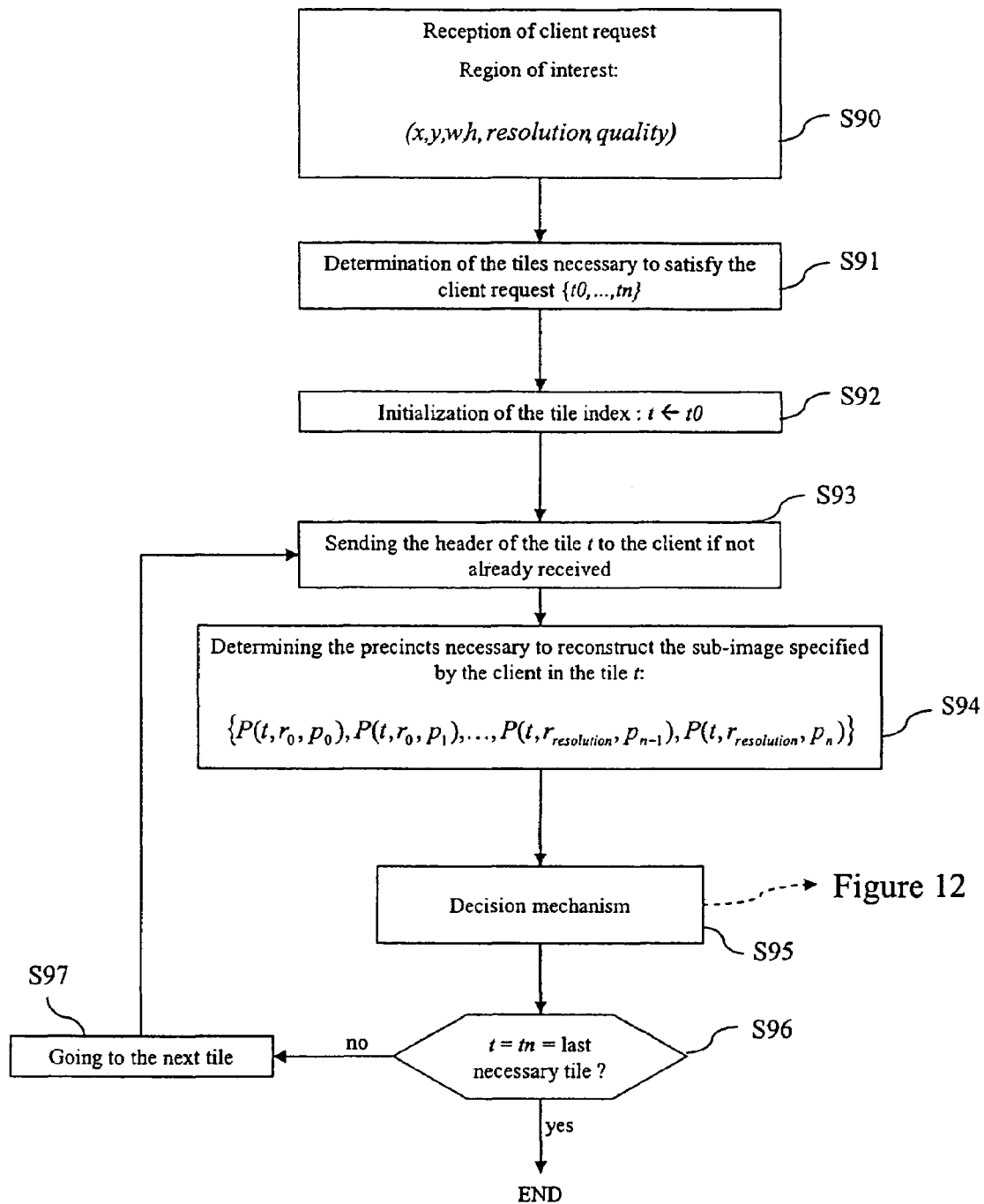
FIG. 11 is an algorithm implemented by the first communication apparatus (server) and which concerns the selection of data of a signal by that apparatus, according to a second embodiment of the invention.
Figure 12:
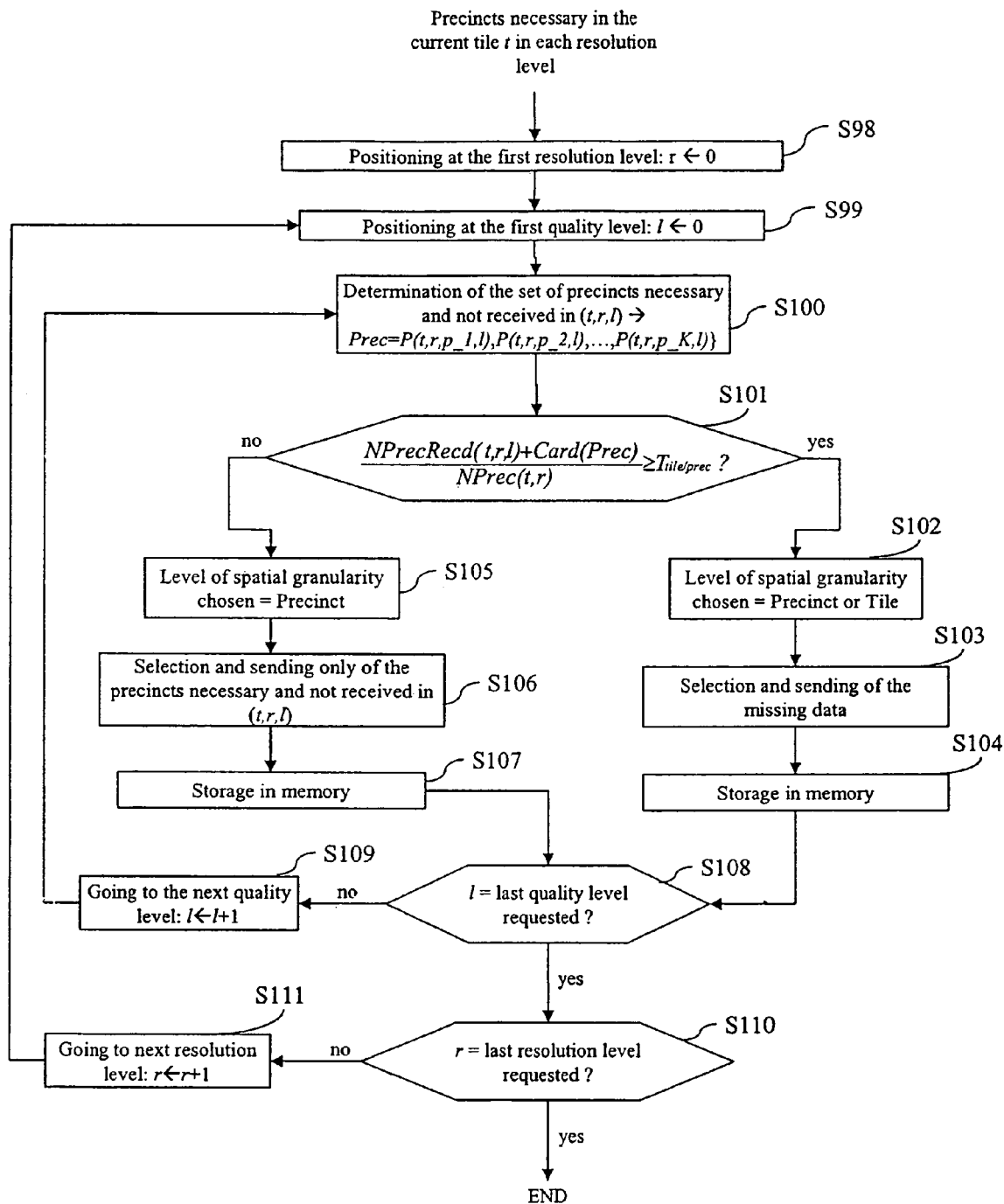
FIG. 12 is an algorithm detailing the operations carried out at step S95 of the algorithm of FIG. 11.

The algorithms of FIGS. 11 and 12 illustrate a second embodiment of the invention in which the method of selecting data with a view to transmitting that data from the server (first communication apparatus) to the client machine (second communication apparatus) is implemented at the server.

Thus, the step of determining one or more levels of spatial granularity of data of the compressed digital signal available on the server and the step of selecting data of that signal for each of the levels of determined spatial granularity are performed by the server.

The algorithm of FIG. 11 comprises different instructions or portions of software code of which the execution will enable the method according to this second embodiment to be implemented.

In this embodiment, the server 30 of FIG. 1 corresponds to the apparatus of FIG. 2 and the computer program "Progr" stored on that apparatus is based on the algorithm of FIGS. 11 and 12.

The algorithm of FIG. 11 comprises a first step S90 of receiving a user request coming from the client machine 32 of FIG. 1.

This request specifies the spatial part of the compressed signal or region of interest desired by the user.

It should also be noted that at this step the server may also receive from the client machine information on the data which the client machine has previously received in response to one or more earlier user requests formulated by the latter.

Thus, the server may know the state of the cache memory of the client machine.

In this embodiment, it will be noted that the user request received by the server specifies the coordinates (x, y) and the size (width w, height h) as well as the resolution level and the quality level of the part of the signal desired by the user.

This is because the entirety of the processing of that user request will here be performed by the server, which makes it possible to relieve the client machine of a certain number of tasks.

This may prove useful when the client machine has a small computational capacity and/or a storage capacity of reduced size.

During the following step S91, the server performs the determination of the tiles of the compressed digital signal which are necessary to satisfy the user request.

The set of tiles is denoted $t_0, \ldots, t_n$.

The following step S92 provides for initializing the index of current tile t to the value $t_0$.

During the following step S93 it is provided to transmit the header of the current tile t to the client machine if that header has not already been transmitted to it.

To do this, the server will verify, as a function of the information which has been communicated to it by the client machine, whether the transmission of the corresponding tile header is really necessary.

It should also be noted that the knowledge by the server of the state of the cache memory of the client machine or of a plurality of them may also arise from the fact that the server maintains in memory all the data which it has transmitted previously to that or those client machines.

The algorithm next comprises a step S94 during which determination is made of the precincts which are necessary to reconstruct the region of interest desired by the user in the current tile considered.

In case an unreliable communication protocol is used for the transmission of data over the network, for example of UDP type, the server must wait to receive acknowledgements (receipt notification) from the client machine to be able to consider as having been received those items of data which have been acknowledged by the latter.

The following step S95 provides for implementing the decision mechanism according to the invention during which the server determines the most appropriate level or levels of spatial granularity of data (the levels of spatial granularity are those of the tile or precinct) and selects for each of these levels of granularity the corresponding data.

Thus, for each quality level considered in the tiles and for the resolution levels gone through, the server computer chooses between two possibilities:

to entirely complete the current quality level by transferring the packets of all the precincts not received by the client machine at that level, which also includes the data packets which are not necessary for the reconstruction of the part of the signal desired by the user;

to transmit solely the data packets of the precincts not received by the client machine and which are strictly necessary for the reconstruction of the desired part of the signal.

It will also be noted that when the server decides to entirely complete a quality level, it only transmits to the client machine the data packets of the precincts which have not been received by the latter, on the contrary to the first embodiment where it is decided to request from the server a superset of data with respect to the set of data necessary and not received.

This is in fact possible since the server has knowledge of the data packets already received by the client machine.

It should also be noted that in the algorithm corresponding to the second embodiment of the invention it is not provided to transmit code-blocks.

Nevertheless, the choice between the different levels of spatial granularity which are the tile, the packet and the code-block can of course be envisaged in a variant embodiment.

This also applies for the choice between the levels of spatial granularity which are a tile and a code-block.

The decision mechanism illustrated at step S95 of the algorithm of FIG. 11 will be detailed later with reference to FIG. 12.

During the following step S96 a test is carried out in order to determine whether the current tile i considered corresponds to the last tile necessary to satisfy the user request.

In the negative, that step is followed by a step S97 during which the index t of the current tile is incremented by one unit before passing on to step S93 already described above.

On the contrary, when all the tiles necessary to satisfy the user request have been processed by that algorithm, the execution of the latter is made to terminate.

FIG. 12 illustrates the algorithm detailing the different operations performed during step S95 of the algorithm of FIG. 11.

More particularly, that algorithm contains different instructions or portions of software code corresponding to steps of the method of selecting data according to the invention.

The computer program "Progr" stored in the apparatus of FIG. 2 also relies on that algorithm for its execution.

Taking into account the determination of the precincts necessary to reconstruct the region of interest desired by the user in the current tile t, the algorithm of FIG. 12 comprises a first step of going to the first resolution level r=0 of that tile.

During the following step S99, it is provided to go to the first quality level l=0 of the resolution level r=0 of the current tile t.

The following step S100 provides for determining the set of the precincts necessary to reconstruct the region of interest desired by the user and not received by the client machine.

This set is denoted Prec.

It should be noted that during the execution of that step the server verifies the precincts that the client machine already holds in memory, either by the information received from the latter at step S90, or by the prior storage in memory of the data transmitted by the server to that client machine.

It should be noted that the server marks the data which it has transmitted to the client machine as received.

During the following step S101 it is provided to perform a comparison of the ratio of the sum of the number of precincts of the aforementioned set of precincts Prec plus the number of precincts already received for the current quality level l, to the total number of precincts contained in the current resolution level, with a predetermined threshold $T_{tile/prec}$.

The threshold $T_{tile/prec}$ corresponds to the threshold used during the steps already described above: S24, S25, S74 and S75.

When the result of that comparison is positive, it is decided to select a superset of data with respect to the set of data necessary and not yet received by the client machine.

On the contrary, when the result of that comparison is negative, it is decided to solely select the set of data necessary and not yet received.

Thus, when the aforementioned ratio is greater than the threshold, step S101 is followed by a step S102 during which the level of spatial granularity of data is determined as a function of the region of interest desired by the user and of the structure and organization of the data in the signal.

More particularly, a choice is made between two levels of spatial granularity which are the tile and the precinct (data packet) taking into account the knowledge by the server of the data already received by the client machine.

Thus, if the client machine has received no data concerning the current tile, it is provided at step S103 to select the data corresponding to that tile (all the precincts composing that tile) and to transmit that data in the form of packets to the client machine.

If, on the contrary, the client machine has already received certain of the data corresponding to the current tile considered, then it is provided at step S102 to determine that the level of spatial granularity selected will be the precinct.

Thus, at step S103 the precincts of the current tile will be selected which have not yet been received by the client machine but which are not necessarily all included in the user request.

These precincts are then transmitted to the client machine in the form of data packets.

Consecutively to step S103 a step S104 is provided of storing in memory the data so transmitted, which enables the server to maintain a trace of the transmitted data and thus to constitute the state of the cache memory of the client machine.

Returning to step S101, when the ratio is less than the predetermined threshold, that step is followed by a step S105 during which, as a function of the region of interest desired by the user and of the structure and organization of the data in the signal, it is determined that the level of spatial granularity is the precinct.

Next at step S106 selection of the data corresponding to that level of spatial granularity is made as a function of the region of interest desired by the user and of the structure and organization of the data in the signal.

Thus, solely the precincts which are necessary to reconstruct the region of interest and which have not been received by the client machine are selected.

This data is next transmitted over the network to the client machine in the form of data packets.

During the following step S107 it is provided to store in memory the data so transmitted for the same reasons as those given at step S104.

When one of the steps S104, S107 has terminated, the algorithm comprises a step S108 during which a test is performed in order to determine whether the current quality level l considered is the last for the current tile t.

In the negative, that quality level is incremented by one unit during the following step S109 and then step S100 previously described above is proceeded to.

On the contrary, when the last quality level of the current tile t considered has been reached, step S108 is followed by a step S110 which provides for performing a test to know if the current resolution level corresponds to the last resolution level desired.

In the negative, that step is followed by a step S111 during which account is taken of the following resolution level r+1 and that step is then followed by the step S99 already described above.

On the contrary, when the last resolution level desired has been reached, the algorithm of FIG. 12 is made to terminate and step S95 of the algorithm of FIG. 11 is then followed by step S96 already described above.

It should be noted that the invention makes it possible to provide an adapted and optimized translation of a part of the signal (region of interest) desired by the user and a set of data of different levels of spatial granularity which enable the user request to be satisfied.

It should also be noted that it is possible to have only a single level of spatial granularity of data to reconstitute the region of interest desired by the user.

According to a variant, the server may determine a surplus of data to transmit which approaches a predetermined throughput budget without exceeding it.

Furthermore, the decision mechanism provided in the different embodiments and variants described above makes it possible, when it takes into account a plurality of the criteria illustrated in FIG. 4, to achieve a good compromise between the use of the available bandwidth, the complexity of analysis (parsing) and of extraction of compressed data, the memory capacity and/or the computational capacity of the client machine.

The implementation of the invention is described above for a system of progressive transmission of images in accordance with the JPEG2000 standard and using a specific protocol. This protocol makes it possible in particular to transfer JPEG2000 data in the form of groups of packets corresponding spatially to a whole tile, one or more precincts, or one or more codeblocks.

The new JPIP protocol ("*JPEG2000 image coding system—Part 9: Interactivity tools, APIs and protocols—Final Committee Draft*" ISO/IEC JTC1/SC29 WG1 N3052R, R. Prandolini, S. Houchin, G. Colyer, 11 Aug. 2003) defines two types of media termed JPP-STREAM and JPT-STREAM which are bitstreams in a specific format. JPP-STREAM and JPT-STREAM media types are also referred to.

The return data using the JPIP protocol (from a server to a client) conform to one of the two JPP-STREAM and JPT-STREAM media types.

A JPIP return data stream consists of the concatenation of a sequence of JPIP return messages, each message representing the incremental contribution to a segment of data termed data-bin. Several classes of data-bin are defined by the JPIP standard. A data-bin contains a portion of a JPEG2000 file defined according to its class.

A JPIP response consists of a header paragraph in accordance with the http/1.1 protocol ("*Hypertext Transfer Protocol—HTTP/1.1*", http://www.w3.org/Protocols/rfc2616/rfc2616.html), followed by a sequence of concatenated return messages. Each JPIP return message is constituted by a header and a body, the header of a message containing the following fields:

Bin-Id[, Csn], Msg-Offset, Msg-Length [, Aux]

The purpose of the fields Bin-Id and [, Csn] is to uniquely identify the data-bin to which the message considered contributes and they transport the three following items of information:

the index of the codestream to which the data-bin belongs, when the initial JPEG2000 file contains a plurality of codestreams.

the identifier of the class (Class-Id) of the data-bin considered.

the identifier of the data-bin within its class (the term "In-Class-Id" is also used).

The fields Msg-Offset and Msg-Length which follow in the header of the message indicate the bytes which are transported by the body of the return message. Thus, the data-bin identified by the beginning of the header contains a segment of data of the initial JPEG2000 file.

The field Msg-Offset indicates the position of the first byte of the body of the message in that data segment.

The field Msg-Length indicates the number of bytes of payload data contained in the body of the message and extracted from the data-bin from the position Msg-Offset.

Finally, the body of each message is constituted by a series of Msg-Length bytes extracted from the data-bin considered (from the position indicated by the field Msg-Offset).

The JPIP protocol defines the following classes of data-bin:

Metadata-bin: a metadata-bin consists of a byte-range of the bitstream contributing to one or more boxes in the JPEG2000 file format. More detail on the definition of metadata-bins appears in the reference for the JPIP protocol provided above. The In-Class-Id of a metadata-bin is attributed by the server according to its strategy for forming metadata-bins.

Main header data-bin: a main header data-bin consists of a concatenation of marker segments contained in the main header of a JPEG2000 file. Certain markers, of no use to the JPIP client, are excluded from the protocol. The In-Class-Id of the main header data-bin is equal to 0.

Tile header data-bin: a tile header data-bin consists of the concatenation of marker segments of the first tile-part header of a given tile. The identifier of a tile header data-bin within its class is equal to the index of the corresponding tile.

Precinct data-bin (see FIG. 5): a precinct data-bin consists of the byte-range formed by concatenating all the packets of a JPEG2000 codestream belonging to a unique precinct. The identifier of a precinct data-bin is given by:

$I = t + (c + s \times num\_components) \times num\_tiles,$ where t and c represent the tile and component indices corresponding to the precinct, s is the sequence number (defined by JPIP) of the precinct considered in the tile t and the component c. The quantities num_components and num_tiles respectively designate the number of components and number of tiles in the JPEG2000 file considered.

Tile data-bin: a tile data-bin consists of the concatenation of all the tile-parts contained in a tile. The In-Class-Id of a tile data-bin is equal to the index of the corresponding tile.

Note that both media types utilize the metadata-bins and main header data-bin. On the other hand, only the media type JPP-STREAM utilizes the tile header and precinct data-bins. Furthermore, only the media type JPT-STREAM utilizes the tile data-bins.

A JPIP client may specify the type of return data which it wishes to see returned via the JPIP request field "type" or the http request header "Accept:".

Thus, for example, the following two JPIP requests (equivalent if they are sent on http/1.1):

GET /example.jp2?fsiz=800,600&tid=0&type=JPP-STREAM HTTP/1.1 and

GET /example.jp2?fsiz=800,600&tid=0HTTP/1.1
Accept: image/JPP-STREAM both mean that the client desires to receive the data necessary for the image "exemple.jp2" in order to be able to reconstitute the latter at a resolution level corresponding to a viewing window of size 800*600 pixels.

The field "type=JPP-STREAM" of the first request and the http header "Accept: image/jpp-stream" of the second request specify that the client desires to receive the data in the form of precinct data-bin increments, in accordance with the JPP-STREAM media type.

On the contrary, in the following example:

GET /example.jp2?fsiz=800,600&tid=0&type=JPT-STREAM HTTP/1.1 the client desires to receive JPIP return data in accordance with the JPT-STREAM media type.

The invention may apply in the case of the JPIP protocol by making the choice of the type of return data between the two media types JPP-STREAM and JPT-STREAM.

The choice of the type of return data is made via the decision taken by the client between the levels of spatial granularity constituted by the "tile" and the "precinct". This is because the server does not have the right to attribute the same unique identifier "tid" to data coming from the same JPEG2000 image but transferred via different media types.

It should be noted that the field "tid" is present in the client requests to uniquely identify a JPEG2000 image at the server.

The invention may thus be implemented in respect of the client with the JPIP protocol (algorithm of FIG. 10), and in a communication scenario termed "no state". In the "no state" operating mode of the JPIP protocol, the server does not maintain a model of the status of the client's cache during a JPIP communication session.

An advantageous scenario for utilization of a mechanism for choice between precincts and tiles will now be described below in the case of a JPIP transmission system.

The progressive viewing of an image in accordance with the JPEG2000 standard in a client-server application often consists, in a first step, of viewing a reduced version of the entire image, at a size corresponding to the display window of the client application.

Next, in a second step, the user typically performs operations of zooming and of increasing the quality of display of the image for the spatial regions of interest each corresponding to a portion of the image in its upper resolution levels.

Consequently, in the case of an image constituted by a single tile and a multitude of precincts of small size, the choice of the media type JPT-STREAM appears well-adapted for carrying out the first step dealt with above, since the entire surface of the image at a given resolution level is transferred from the server to the client. The advantage of the media type JPT-STREAM in this case derives from the fact that it makes it possible to transfer the totality of the desired compressed data in a single JPIP return message.

On the contrary, concerning the second step dealt with above of viewing the image, the JPP-STREAM media type appears the best adapted. This is because the tile data-bin corresponds, for an image containing a single tile, to the total surface of the image at a given resolution level. Consequently, if the user wishes to, view the JPEG2000 image at a high resolution level, the precinct constitutes the best adapted level of spatial granularity.

Figure 13:
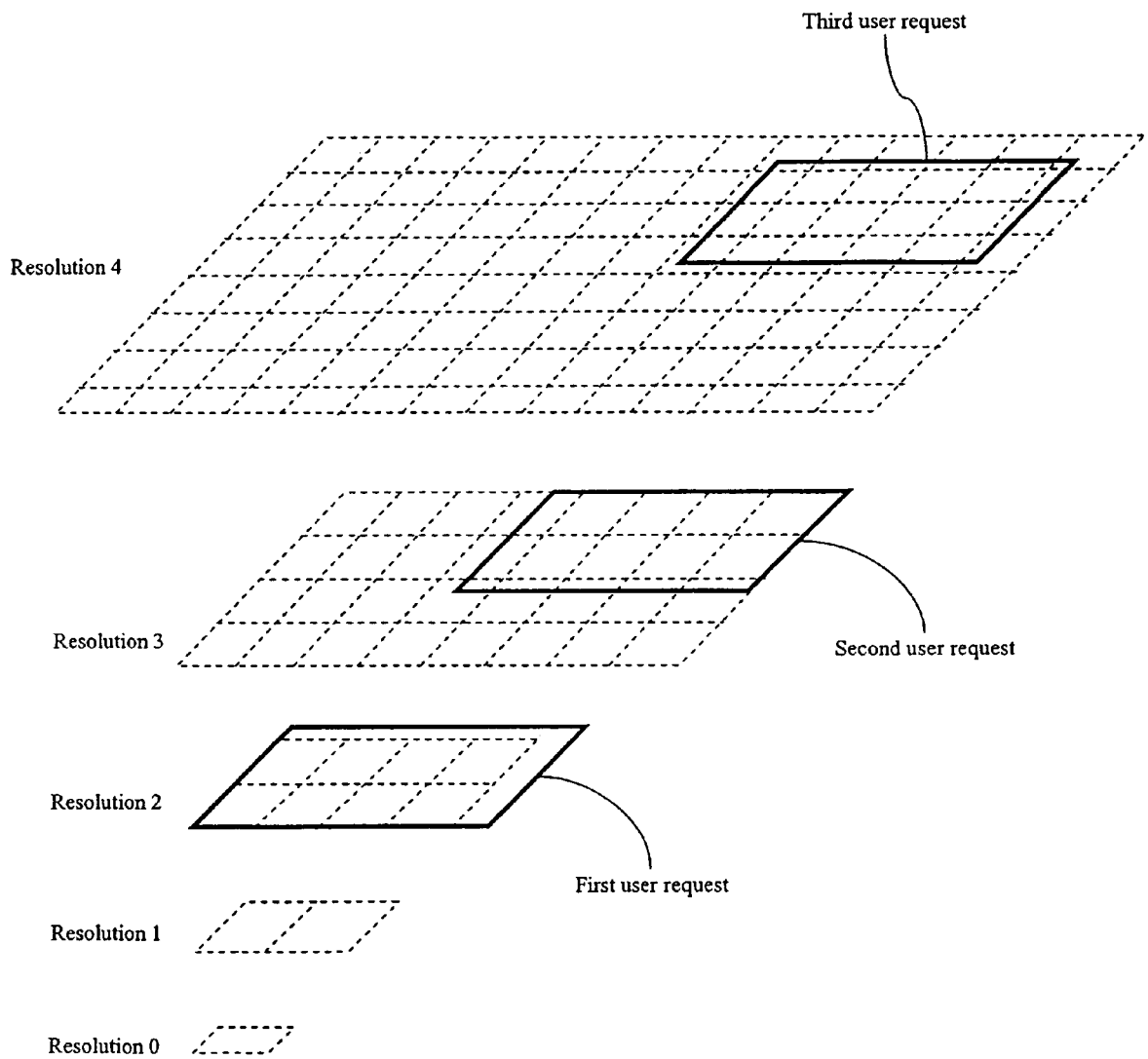
FIG. 13 is an illustration of several user requests for different resolution levels in the same sub-band of an image.

What has just been described is illustrated by FIG. 13 which represents a component at different resolution levels of an image conforming to the JPEG2000 standard constituted by a single tile and multiple precincts.

The partition of each sub-band into precincts is illustrated by dashed lines.

In FIG. 13 successive viewing windows have also been represented corresponding to the different user requests in a practical scenario of navigation in a JPEG2000 image.

It appears that the first user request (that request corresponding to the first step dealt with above of viewing a JPEG2000 image) necessitates the retrieval of all the precincts contained in the resolution levels 0 to 2 and the tile thus appears as the spatial entity which best corresponds to the region requested.

Satisfying that user request at the server may be achieved by forming only a single tile data-bin increment in accordance with the JPT-STREAM media type.

Consequently, the choice of this media type in the client JPIP request appears judicious since it simplifies the processing of the JPIP request by the server.

Furthermore, the second and third requests (second step dealt with above of viewing the image) in the scenario of navigating in the image specify spatial regions of interest which are spatially smaller than the tile and which contain a subset of precincts.

The application of the algorithm of FIG. 10 to this example in the case of the JPIP protocol will lead the client to choose the JPP-STREAM media type in order to specify the level of spatial granularity of the data returned by the server.

It should be noted that the implementation of the invention in the case of the use of the new JPIP protocol necessitates having a JPIP server capable of delivering both the media types JPP-STREAM and JPT-STREAM.

Furthermore, this also implies increased complexity for the management of the JPIP client's cache memory with respect to the case in which a single media type would be used per JPEG2000 image.

The invention claimed is:

1. A method of selecting data of a compressed digital signal comprising a plurality of levels of spatial granularity of data, in a communication network comprising at least two communication apparatuses connected together by the network, the digital signal being available at least at one, so-called first, of the communication apparatuses, the data being adapted to be transmitted from the first apparatus to the other, so-called second, communication apparatus, and that data being sufficient to reconstitute a spatial part of the signal termed region of interest which is specified at the second apparatus, characterized in that the method comprises the following steps:

determining a set of data necessary to satisfy a request and not yet received by the second communication apparatus, taking into account the data received previously by that apparatus;

determining at least one level of spatial granularity of data as a function of the region of interest and of the structure and organization of the data in the signal; and selecting data for each determined level of granularity as a function of the region of interest and of the structure and organization of the data in the signal;

wherein, determining at least one level of spatial granularity depends on the determined set of data, the minimum quantity of data to be received by the second apparatus to reconstitute the region of interest, and the total quantity of data present in the signal, including precincts that overlap the region of interest and precincts that do not overlap the region of interest.

2. A method according to claim 1, characterized in that determining at least one level of spatial granularity and selecting data are also performed as a function of at least one characteristic of the network and/or of at least one characteristic of at least one of the first and second communication apparatuses.

3. A method according to claim 1, characterized in that, prior to the step of determining at least one level of granularity of data, the method comprises at least a first step of comparing, with respect to a threshold, the ratio of the sum of the quantity of data already present on the second apparatus plus the minimum quantity of data to be received by the second apparatus to reconstitute the region of interest, to the total quantity of data present in the signal, the data of the ratio corresponding to a given level of spatial granularity.

4. A method according to claim 3, characterized in that, where there is at least one level of spatial granularity hierarchically lower than the given level of the first step of comparison, then as a function of the result of the comparison, either the selecting step makes provision for selecting a superset of data with respect to the set of data necessary and not yet received, or the method comprises a second step of comparison with respect to a threshold of a ratio using a proportion of data of a hierarchically lower level of spatial granularity.

5. A method according to claim 3, characterized in that, where the given level of spatial granularity of the first comparing step is the lowest level hierarchically, then as a function of the result of the comparison, the selecting step makes provision for selecting either a superset of data with respect to the set of data that is necessary and not yet received, or only that set.

6. A method according to claim 4, characterized in that, where a superset of data is selected, the method comprises a third step of comparison with respect to a threshold of the ratio of the quantity of data not received to the total quantity of data present in the signal, the data corresponding to the same given level of spatial granularity as for the first comparison step.

7. A method according to claim 6, characterized in that, as a function of the result of the comparison, the step of determining a level of spatial granularity leads either to the given level of spatial granularity of the first step of comparison, or to a level of spatial granularity hierarchically superior.

8. A method according to claim 3, characterized in that determining at least one level of spatial granularity and selecting data are also performed as a function of at least one characteristic of the network and/or of at least one characteristic of at least one of the first and second communication apparatuses, the threshold representing the characteristic or characteristics of the network and/or the characteristic or characteristics of at least one of the first and second communication apparatuses.

9. A method according to, claim 1, characterized in that the steps of determining and selecting are caffied out by the second communication apparatus.

10. A method according to claim 9, characterized in that comprises a step of transmitting commands to the first communication apparatus specifying data of different levels of spatial granularity which have been selected, each command specifying data of the signal at a level of granularity which has been determined.

11. A method according to claim 1, characterized in that the steps of determining and selecting are caffied out by the first communication apparatus.

12. A method according to claim 11, characterized in that it comprises a step performed by the first communication apparatus of storing data which it has previously transmitted to the second communication apparatus in response to one or more earlier requests from the latter.

13. A method according to claim 11, characterized in that it comprises a step performed by the first communication apparatus, of receiving from the second communication apparatus information on the data which the latter has previously received in response to one or more previous requests.

14. A method according to claim 1, characterized in that the compressed digital signal is an image signal comprising at least one tile having at least one resolution level, each resolution level comprising at least one precinct constituted by at least one code-block, which is located in the different frequency sub-bands of the resolution level considered and which corresponds to the same spatial position in the image signal.

15. A method according to claim 14, characterized in that the step of determining at least one level of spatial granularity of the data provides for choosing between the tile and the precinct.

16. A method according to claim 15, characterized in that use is made of the protocol JPIP for transmitting data between communication apparatuses.

17. A method according to claim 16, characterized in that choosing between the tile and the precinct amounts to choosing between JPT-STREAM and JPP-STREAM media types for transmitting data.

18. A method according to claim 14, characterized in that the step of determining at least one level of spatial granularity of the data provides for choosing between the tile, the precinct and the code-block.

19. A device for selecting data of a compressed digital signal comprising a plurality of levels of spatial granularity of data, in a communication network comprising at least two communication apparatuses connected together by the network, the digital signal being available at least at one, so-called first, of the communication apparatuses, the data being adapted to be transmitted from the first apparatus to the other, so-called second, communication apparatus, and that data being sufficient to reconstitute a spatial part of the signal termed region of interest which is specified at the second apparatus, characterized in that the device comprises:
    means for determining a set of data necessary to satisfy a request and not yet received by the second communication apparatus, taking into account the data received previously by that apparatus;
    means for determining at least one level of spatial granularity of data as a function of the region of interest and of the structure and organization of the data in the signal; and
    means for selecting data for each determined level of granularity as a function of the region of interest and of the structure and organization of the data in the signal;
    wherein, determining at least one level of spatial granularity depends on the determined set of data, the minimum quantity of data to be received by the second apparatus to reconstitute the region of interest, and the total quantity of data present in the signal, including precincts that overlap the region of interest and precincts that do not overlap the region of interest.

20. A device according to claim 19, characterized in that determining at least one level of spatial granularity and selecting data also takes into account at least one characteristic of the network and/or of at least one characteristic of at least one of the first and second communication apparatuses.

21. A device according to claim 19, characterized in that it comprises means for comparing, with respect to a threshold, the ratio of the sum of the quantity of data already present on the second apparatus plus the minimum quantity of data to be received by the second apparatus to reconstitute the region of interest, to the total quantity of data present in the signal, the data of the ratio corresponding to a given level of spatial granularity.

22. A device according to claim 21, characterized in that determining at least one level of spatial granularity and selecting data also takes into account at least one characteristic of the network and/or at least one characteristic of at least one of the first and second communication apparatuses, the threshold representing the characteristic or characteristics of the network and/or of the characteristic or characteristics of at least one of the first and second communication apparatuses.

23. A device according to claim 19, characterized in that the means for determining and selecting form part of the second communication apparatus.

24. A device according to claim 23, characterized in that comprises means for transmitting commands to the first communication apparatus specifying data of different levels of spatial granularity which have been selected, each command specifying data of the signal at a level of granularity which has been determined.

25. A device according to claim 19, characterized in that the means for determining and selecting form part of the first communication apparatus.

26. A device according to claim 25, characterized in that it comprises, in the first communication apparatus, means for storing data which the first apparatus has previously transmitted to the second communication apparatus in response to one or more earlier requests from the latter.

27. A device according to claim 26, characterized in that it comprises, in the first communication apparatus, means for receiving from the second communication apparatus information on the data which the latter has previously received in response to one or more previous requests.

28. A device according to claim 19, characterized in that the compressed digital signal is an image signal comprising at least one tile having at least one resolution level, each resolution level comprising at least one precinct constituted by at least one code-block, which is located in the different frequency sub-bands of the resolution level considered and which corresponds to the same spatial position in the image signal.

29. A device according to claim 28, characterized in that the means for determining at least one level of spatial granularity of the data provide for choosing between the tile and the precinct.

30. A device according to claim 29, characterized in that use is made of the protocol JPIP for transmitting data between communication apparatuses.

31. A device according to claim 30, characterized in that choosing between the tile and the precinct amounts to choosing between JPT-STREAM and JPP-STREAM media types for transmitting data.

32. A device according to claim 28, characterized in that the means for determining at least one level of spatial granularity of the data provide for choosing between the tile, the precinct and the code-block.

33. A communication apparatus, characterized in that it comprises a device for selecting data according to claim 19.

34. A computer-readable storage medium on which is stored a computer executable program which can be loaded into a programmable apparatus, the program implementing the method of selecting data according to claim 1.

35. A method of selecting data of a compressed digital signal comprising a plurality of levels of spatial granularity of data, in a communication network comprising at least two communication apparatuses connected together by the network, the digital signal being available at least at one, so-called first, of the communication apparatuses, the data being adapted to be transmitted from the first apparatus to the other, so-called second, communication apparatus, and that data being sufficient to reconstitute a spatial part of the signal termed region of interest which is specified at the second apparatus, characterized in that the method comprises the following steps:

determining a set of data necessary to satisfy a request and not yet received by the second communication apparatus, taking into account the data received previously by that apparatus;

comparing, with respect to a threshold, the ratio of a sum of the quantity of data already present on the second apparatus plus a minimum quantity of data to be received by the second apparatus to reconstitute the region of interest, to a total quantity of data present in the signal, the data of the ratio corresponding to a given level of spatial granularity;

determining at least one level of spatial granularity of data as a function of the region of interest and of the structure and organization of the data in the signal; and selecting data for each determined level of granularity as a function of the region of interest and of the structure and organization of the data in the signal;

wherein, determining at least one level of spatial granularity depends on the determined set of data, the minimum quantity of data to be received by the second apparatus to reconstitute the region of interest, and the total quantity of data present in the signal.

36. A device for selecting data of a compressed digital signal comprising a plurality of levels of spatial granularity of data, in a communication network comprising at least two communication apparatuses connected together by the network, the digital signal being available at least at one, so-called first, of the communication apparatuses, the data being adapted to be transmitted from the first apparatus to the other, so-called second, communication apparatus, and that data being sufficient to reconstitute a spatial part of the signal termed region of interest which is specified at the second apparatus, characterized in that the device comprises:

means for determining a set of data necessary to satisfy a request and not yet received by the second communication apparatus, taking into account the data received previously by that apparatus;

means for comparing, with respect to a threshold, a ratio of a sum of the quantity of data already present on the second apparatus plus a minimum quantity of data to be received by the second apparatus to reconstitute the region of interest, to a total quantity of data present in the signal, the data of the ratio corresponding to a given level of spatial granularity;

means for determining at least one level of spatial granularity of data as a function of the region of interest and of the structure and organization of the data in the signal; and means for selecting data for each determined level of granularity as a function of the region of interest and of the structure and organization of the data in the signal;

wherein, determining at least one level of spatial granularity depends on the determined set of data, the minimum quantity of data to be received by the second apparatus to reconstitute the region of interest, and the total quantity of data present in the signal.

* * * * *

UNITED STATES PATENT AND TRADEMARK OFFICE
CERTIFICATE OF CORRECTION

PATENT NO.        : 7,397,958 B2
APPLICATION NO.   : 10/684504
DATED             : July 8, 2008
INVENTOR(S)       : Fabrice Le Leannec et al.

It is certified that error appears in the above-identified patent and that said Letters Patent is hereby corrected as shown below:

TITLE PAGE COLUMN 2 LINE 11 OTHER PUBLICATIONS:
    (56) Page 2, "<http://www.w3.org/Protocol/rfc2616,html>." should read
-- <http://www.w3.org/Protocol/rfc2616.html>. --.

COLUMN 4:
    Line 29, "make" should read -- makes --; and
    Line 38, "in case" should read -- in a case where --.

COLUMN 16:
    Line 67, "it" should read -- its --.

COLUMN 18:
    Line 32, "of the" should be deleted;
    Line 37, "consists" should read -- consist --; and
    Line 57, "would however" should read -- would, however, --.

COLUMN 20:
    Line 17, "However" should read -- However, --; and
    Line 38, "FIG.7." should read -- (FIG.7). --.

COLUMN 21:
    Line 11, "Nevertheless" should read -- Nevertheless, --.

COLUMN 24:
    Line 18, "Next at step S106" should read -- Next, at step S106, --.

COLUMN 27:
    Line 19, "interest" should read -- interest, --; and
    Line 35, "to," should read -- to --.

COLUMN 29:
    Line 26, "to," should read -- to --;
    Line 27, "caffied" should read -- carried --;
    Line 29, "that" should read -- that it --; and
    Line 36, "caffied" should read -- carried --.

CERTIFICATE OF CORRECTION (continued)
U.S. Pat. No. 7,397,958 B2

COLUMN 30:
    Line 59, "that" should read -- that it --.

Signed and Sealed this

Ninth Day of February, 2010

David J. Kappos
*Director of the United States Patent and Trademark Office*